US012641235B2

(12) United States Patent
Lin et al.

(10) Patent No.: US 12,641,235 B2
(45) Date of Patent: May 26, 2026

(54) ENCODING METHOD AND ELECTRONIC DEVICE

(71) Applicant: Huawei Technologies Co., Ltd., Shenzhen (CN)

(72) Inventors: Zehui Lin, Shenzhen (CN); Kangying Cai, Beijing (CN); Rong Wei, Shenzhen (CN); Yunneng Mo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/884,380

(22) Filed: Sep. 13, 2024

(65) Prior Publication Data

US 2025/0008104 A1 Jan. 2, 2025

Related U.S. Application Data

(63) Continuation of application No. PCT/CN2023/080100, filed on Mar. 7, 2023.

(30) Foreign Application Priority Data

Mar. 15, 2022 (CN) .......................... 202210255740.4

(51) Int. Cl.
*H04N 19/124* (2014.01)
*G06T 15/80* (2011.01)
(Continued)

(52) U.S. Cl.
CPC ........... *H04N 19/124* (2014.11); *G06T 15/80* (2013.01); *H04N 19/146* (2014.11); *H04N 19/164* (2014.11)

(58) Field of Classification Search
CPC .............. H04N 19/124; H04N 19/146; H04N 19/164; G06T 15/80
See application file for complete search history.

(56) References Cited

U.S. PATENT DOCUMENTS

| | | | |
|---|---|---|---|
| 10,641,472 | B1 | 5/2020 | Johnson |
| 2014/0092120 | A1 | 4/2014 | Demos |

(Continued)

FOREIGN PATENT DOCUMENTS

| | | |
|---|---|---|
| CN | 114028804 A | 2/2022 |
| CN | 114445257 A | 5/2022 |

(Continued)

OTHER PUBLICATIONS

Michael Stengel NVIDIA et al:"A Distributed, Decoupled System for Losslessly Streaming Dynamic Light Probes to Thin Clients," Mar. 10, 2021, total 13 pages.

(Continued)

*Primary Examiner* — On S Mung
(74) *Attorney, Agent, or Firm* — Conley Rose, P.C.

(57) ABSTRACT

An encoding method includes obtaining probe data, where the probe data corresponds to one or more probes in a three-dimensional (3D) scene, and the probe data is used by a second device to determine shading effect of an object in the 3D scene in a rendering process; performing data form conversion on the probe data to obtain intermediate data, where the data form conversion includes domain conversion; and encoding the intermediate data to obtain a corresponding bitstream.

20 Claims, 19 Drawing Sheets

(51) Int. Cl.
  *H04N 19/146*   (2014.01)
  *H04N 19/164*   (2014.01)

(56) References Cited

U.S. PATENT DOCUMENTS

| | | | |
|---|---|---|---|
| 2014/0327690 A1 | 11/2014 | Mcguire et al. | |
| 2015/0245044 A1 | 8/2015 | Guo et al. | |
| 2016/0269723 A1* | 9/2016 | Zhou | G06T 5/70 |
| 2021/0012562 A1 | 1/2021 | Mcguire et al. | |
| 2021/0201434 A1* | 7/2021 | Wang | G06F 9/3885 |

FOREIGN PATENT DOCUMENTS

| | | | |
|---|---|---|---|
| JP | 2021523442 A | 9/2021 | |
| WO | 2020183839 A1 | 9/2020 | |

OTHER PUBLICATIONS

Zina H. Cigolle et al, "A Survey of Efficient Representations for Independent Unit Vectors," Apr. 17, 2014, total 30 pages.

Ari Silvennoinen et al, "Moving Basis Decomposition for Precomputed Light Transport," Jul. 15, 2021, total 11 pages.

Ko Nishino et al, "Clustered Blockwise PCA for Representing Visual Data," IEEE Transactions on Pattern Analysis and Machine Intelligence, vol. 27, No. 10, Oct. 2005, total 5 pages.

Gross M H et al: "Two Methods for Wavelet-Based Volume Rendering", Computers and Graphics, Elsevier, GB, vol. 21, No. 1, Jan. 1, 1997, XP000928981, total 16 pages.

Luc Claustres et al: "Wavelet encoding of BRDFs for real-time rendering", Graphics Interface 2005: Proceedings; Victoria, British Columbia, May 9-11, 2005, Canadian Information Processing Society, 403 King Street West, Suite 205 Toronto, Ont. M5U 1LS Canada, May 28, 2007, XP058334944, total 8 pages.

* cited by examiner

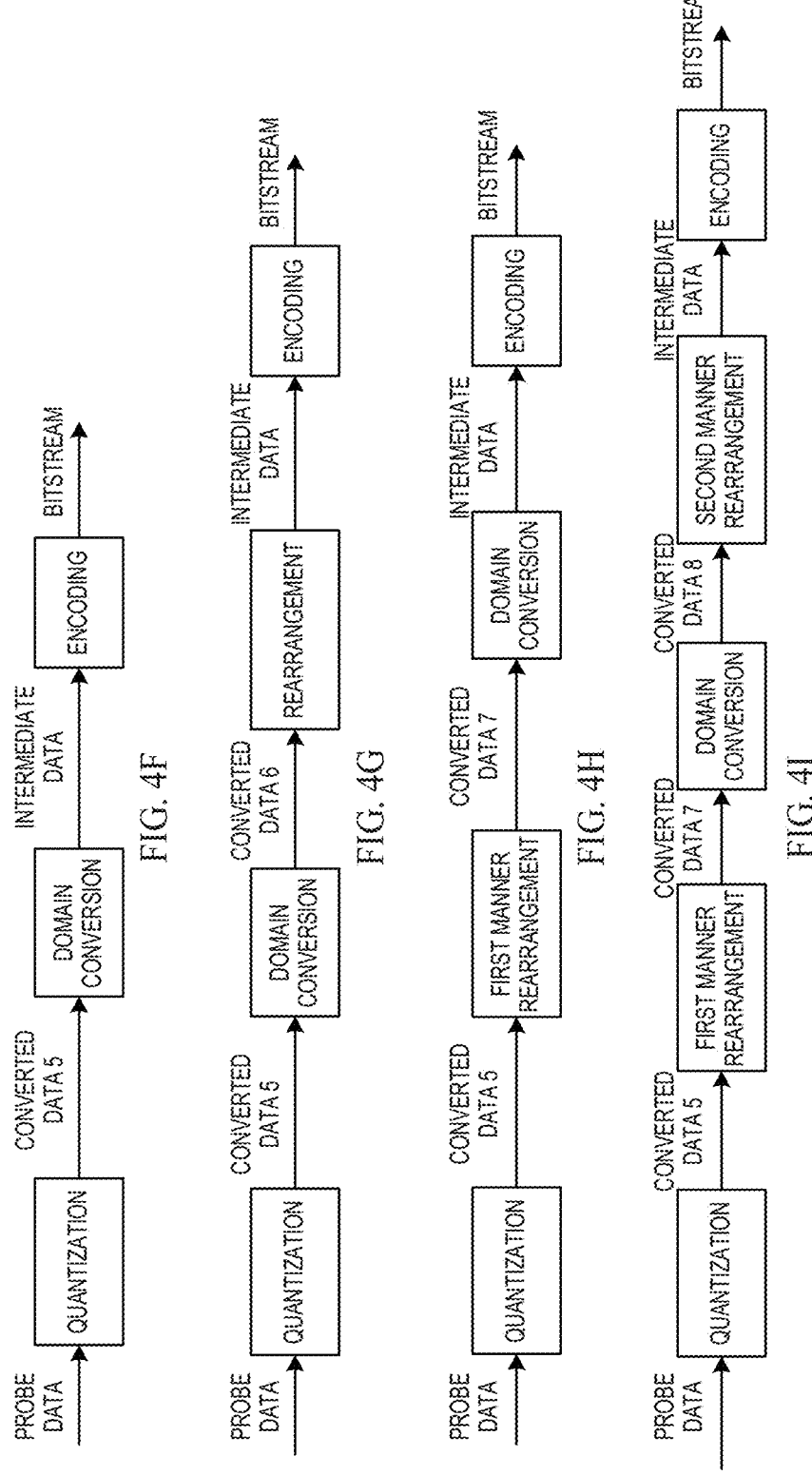

| BITSTREAM STRUCTURE INFORMATION | INTERMEDIATE DATA CORRESPONDING TO ILLUMINATION DATA | INTERMEDIATE DATA CORRESPONDING TO VISIBILITY DATA | ATTRIBUTE DATA |
|---|---|---|---|

ENCODING METHOD AND ELECTRONIC DEVICE

CROSS-REFERENCE TO RELATED APPLICATIONS

This is a continuation of International Patent Application No. PCT/CN2023/080100 filed on Mar. 7, 2023, which claims priority to Chinese Patent Application No. 202210255740.4 filed on Mar. 15, 2022. The disclosures of the aforementioned applications are hereby incorporated by reference in their entireties.

TECHNICAL FIELD

Embodiments of the present disclosure relate to the encoding and decoding field, and in particular, to an encoding method and an electronic device.

BACKGROUND

As people gradually raise a requirement for quality of a rendered image, a means for simulating shading effect in a rendering process also gradually transits from a previous means of simulating shading effect of direct illumination (that is, simulating shading effect of performing one time of reflection of a light ray) to a means of simulating shading effect of indirect illumination (that is, simulating shading effect of performing a plurality of times of reflection of a light ray), to make the image more vivid. A probe is one of manners to simulate the shading effect of indirect illumination.

Currently, in a device-cloud synergy scene, a cloud generates probe data, compresses the probe data, and sends the compressed probe data to a device side. After receiving a bitstream, the device side decompresses the bitstream to obtain the probe data, and calculates, in a rendering process based on the probe data obtained through decoding, indirect shading effect generated by a light ray reflected by an object in a three-dimensional (3D) scene.

SUMMARY

The present disclosure provides an encoding method and an electronic device. The method can reduce a bit rate under same rendering effect, or can improve rendering effect under a same bit rate.

According to a first aspect, an embodiment of the present disclosure provides an encoding method. The method includes: obtaining probe data, where the probe data corresponds to one or more probes in a 3D scene, and the probe data is used by a second device to determine shading effect of an object in the 3D scene in a rendering process, where the object in the 3D scene corresponds to a 3D model in the 3D scene, and the model may include an object model or a human model; performing data form conversion on the probe data to obtain intermediate data, where the data form conversion includes domain conversion; and encoding the intermediate data to obtain a corresponding bitstream. In this way, the probe data is converted to a more compact representation form by performing data form conversion on the probe data. Thus, a bit rate can be reduced under same rendering effect. Alternatively, data form conversion is performed on the probe data, to increase a quantity of bits occupied in the bitstream by data of higher importance in a rendering process. Thus, rendering effect is better under a same bit rate.

For example, the encoding method in the present disclosure may be applied to N (N is an integer greater than 1)-end synergy rendering scenes such as cloud game, cloud exhibition, indoor decoration, clothing design, and architectural design scenes. This is not limited in the present disclosure. The first device may be a server, or may be a terminal. The second device may be a terminal.

For example, the encoding method in the present disclosure is applied to a device-cloud synergy rendering scene. The first device is the server, and the second device is the terminal, for example, a terminal device like a personal computer, a mobile phone, or a virtual reality (VR) wearable device.

For example, the domain conversion may refer to converting a representation form of data from one domain to another domain. Domains may be classified from different perspectives based on a requirement. Examples are as follows:

From a perspective of normalization, the domains may be classified into a normalized domain and a non-normalized domain.

From a perspective of a color space, the domains may be classified into an RGB domain, a YUV domain, an XYZ domain, and a Lab domain.

From a perspective of a numerical relationship, the domains may be classified into a linear domain and a non-linear domain. The non-linear domain may be an exponential domain, a perceptual quantizer (PQ) domain, a hybrid log gamma (HLG) domain, or the like.

From a perspective of a numerical representation form, the domains may be classified into a picture domain and a transform domain. For example, the picture domain may be a domain represented by a picture. For example, the transform domain may be a domain represented by a transform basis function and a corresponding transform coefficient. For data $Y(t)$ in the transform domain, approximation may be performed on the data $Y(t)$ by using x transform bases $e\_1(t)$ to $e\_x(t)$, so that the data $Y(t)$ is approximately equal to a sum of products of the x transform bases and corresponding transform coefficients. The transform bases include but are not limited to a spherical harmonic function basis, a spherical wavelet basis, an eigenvector, and the like. This is not limited in the present disclosure.

For example, the RGB domain, the YUV domain, the XYZ domain, and the Lab domain respectively refer to the CIE 1931 RGB color space, a YUV color space (including variants such as YCbCr, YPbPr, and YCoCg), the CIE 1931 XYZ color space, and the CIELAB color space.

For example, any video encoding scheme may be used to encode the intermediate data, to obtain the bitstream corresponding to the probe data. For example, high efficiency video coding (HEVC) encoding may be performed on the intermediate data to obtain the corresponding bitstream. For another example, advanced video coding (AVC) encoding may be performed on the intermediate data to obtain the corresponding bitstream. For still another example, versatile video coding (VVC) encoding may be performed on the intermediate data to obtain the corresponding bitstream. For yet another example, entropy encoding may be performed on the intermediate data to obtain the corresponding bitstream. For yet another example, the intermediate data may be alternatively encoded in another video encoding scheme like the audio video coding standard (AVS) to obtain the corresponding bitstream. This is not limited in the present disclosure.

According to the first aspect, the performing data form conversion on the probe data to obtain intermediate data includes: performing first processing on the probe data to obtain converted data; and performing second processing on the converted data to obtain the intermediate data. When the first processing is domain conversion, the second processing includes quantization and/or first manner rearrangement; and when the second processing is the domain conversion, the first processing includes the quantization and/or the first manner rearrangement. In this way, data form conversion may be performed on the probe data by combining the domain conversion and the quantization, by combining the domain conversion and the first manner rearrangement, or by combining the domain conversion, and the quantization and the first manner rearrangement. Both the quantization and the first manner rearrangement may further convert the data to the more compact representation form, and then data form conversion is performed on the probe data by combining the domain conversion, the quantization, and/or the first manner rearrangement, so that the bit rate can be further reduced.

It should be understood that when the combination of the domain conversion, the quantization, and/or the first manner rearrangement is used, an execution sequence of the domain conversion, the quantization, and the first manner rearrangement is not limited in the present disclosure, a quantity of times that any one of the processing manners of the domain conversion, the quantization, and the first manner rearrangement is performed is not limited either.

For example, the quantization may include uniform quantization or non-uniform quantization. The non-uniform quantization includes but is not limited to u-law quantization, a-law quantization, and the like. This is not limited in the present disclosure. In addition, the quantization may further include adaptive quantization and another type of quantization. This is not limited in the present disclosure either.

For example, the converted data in the present disclosure may include at least one of converted data 1 to converted data 15 in the following embodiments.

According to the first aspect or any one of the foregoing implementations of the first aspect, the performing data form conversion on the probe data to obtain intermediate data further includes: before the performing first processing on the probe data, performing third processing on the probe data. The third processing includes at least one of the following: the domain conversion, the quantization, and the first manner rearrangement. In this way, a quantity of times of performing data form conversion on the probe data can be increased, thereby further reducing the bit rate.

According to the first aspect or any one of the foregoing implementations of the first aspect, after second processing is performed on the converted data and before the intermediate data is obtained, the method further includes: performing second manner rearrangement on the data obtained through second processing to obtain the intermediate data. The second manner rearrangement is padding the data obtained through second processing to a YUV plane. In this way, compression is convenient, and the bit rate can be further reduced.

According to the first aspect or any one of the foregoing implementations of the first aspect, when the probe data is illumination data, and when the illumination data includes a plurality of channels, the first manner rearrangement includes at least one of the following: discarding data of some channels, converting the illumination data to preset precision, or performing dimension conversion on the illumination data.

For example, the preset precision may be set to be greater than or equal to a precision threshold based on a requirement, to ensure precision of the illumination data sent to the second device, thereby ensuring the rendering effect. The precision threshold may be set based on the requirement. For example, if the precision threshold is a 16-bit floating point number, the preset precision may be set to the 16-bit floating point number or a 32-bit floating point number. This is not limited in the present disclosure. In addition, because precision of illumination data generated in different application scenarios may be different, the illumination data in different application scenarios can be converted to same precision by converting the data to the preset precision, thereby facilitating subsequent data form conversion.

It should be noted that the "illumination data" in "converting the illumination data to preset precision" may be original illumination data, illumination data obtained through domain conversion, illumination data obtained through quantization, illumination data obtained by discarding the data of the some channels, or illumination data obtained through dimension conversion.

It should be noted that the "illumination data" in "performing dimension conversion on the illumination data" may be original illumination data, illumination data obtained through domain conversion, illumination data obtained through quantization, illumination data obtained by discarding the data of the some channels, or illumination data converted to the preset precision.

The discarded data of the channels may be data with a small response to determining of the shading effect of the object in the 3D scene by the second device in the rendering process. Therefore, discarding the data of the some channels can improve an encoding speed, and further reduce a delay of sending the probe data from the first device to the second device.

For example, the illumination data may be used to describe emergent illumination of the object around the probe.

For example, the probe data may be a matrix. For example, the dimension conversion may refer to changing a matrix size. For example, the probe data is a 100*1000*3 matrix, and the probe data may be converted to a 50*60*100 matrix through dimension conversion. For another example, the probe data is a 150*240*3 matrix, the probe data may be converted to a 190*190*3 matrix through dimension conversion, and a deficient part is supplemented by using invalid data.

According to the first aspect or any one of the foregoing implementations of the first aspect, when the probe data is visibility data, and when the visibility data includes a plurality of channels, the first manner rearrangement includes at least one of the following: performing channel splitting, converting the visibility data to preset precision, or performing dimension conversion on the visibility data.

It should be noted that the "visibility data" in "converting the visibility data to preset precision" may be original visibility data, visibility data obtained through domain conversion, visibility data obtained through quantization, visibility data obtained through channel splitting, or visibility data obtained through dimension conversion.

It should be noted that the "visibility data" in "performing dimension conversion on the visibility data" may be original visibility data, visibility data obtained through domain conversion, visibility data obtained through quantization, visibility data obtained through channel splitting, or visibility data converted to the preset precision.

For example, the visibility data may be split into a plurality of independent channels through channel splitting. Because a similarity between data of a same channel in different frames is higher than a similarity between data of different channels, it is easier to separately encode the data of the channels subsequently, thereby further reducing the bit rate.

For example, the visibility data may be used to describe distribution (which may also be referred to as depth distribution) of distances between surrounding objects of the probe and the probe, and may include but is not limited to distance data, a variance of the distance data, a square of the distance data, and the like. This is not limited in the present disclosure.

It should be noted that, when the visibility data is single-channel data, the first manner rearrangement may include: converting the visibility data to the preset precision and/or performing dimension conversion on the visibility data.

For example, the preset precision may be set to be greater than or equal to a precision threshold based on a requirement, to ensure precision of the visibility data sent to the second device, thereby ensuring the rendering effect. The precision threshold may be set based on the requirement. For example, if the precision threshold is a 16-bit floating point number, the preset precision may be set to the 16-bit floating point number or a 32-bit floating point number. This is not limited in the present disclosure. In addition, because precision of visibility data generated in different application scenarios may be different, the visibility data in different application scenarios can be converted to same precision by converting the data to the preset precision, thereby facilitating subsequent data form conversion.

According to the first aspect or any one of the foregoing implementations of the first aspect, the domain conversion includes at least one of the following: conversion from a non-normalized domain to a normalized domain, conversion from a linear domain to a non-linear domain, conversion from an RGB domain to a YUV domain, conversion from an RGB domain to an XYZ domain, conversion from an RGB domain to a Lab domain, and conversion from a picture domain to a transform domain.

According to the first aspect or any one of the foregoing implementations of the first aspect, the probe data is represented by a two-dimensional picture, or a spherical harmonic function basis coefficient, or a spherical wavelet basis coefficient.

According to the first aspect or any one of the foregoing implementations of the first aspect, the method further includes: encoding attribute data of the one or more probes to obtain the bitstream. The attribute data includes first attribute data for the data form conversion and/or second attribute data used in the rendering process.

For example, third manner rearrangement may be first performed on the attribute data of the probe, and then attribute data obtained through rearrangement is encoded. The third manner rearrangement may be concatenation.

For example, the first attribute data includes at least one of the following: a quantization parameter, a domain conversion parameter, or a rearrangement parameter.

For example, the domain conversion parameter may include at least one of the following: a normalization parameter, an exponential conversion parameter, a PQ conversion parameter, an HLG conversion parameter, and a color space conversion parameter. This is not limited in the present disclosure.

According to the first aspect or any one of the foregoing implementations of the first aspect, when the probe data includes the illumination data and the visibility data, the bitstream includes bitstream structure information, and the bitstream structure information includes a location of intermediate data corresponding to the illumination data and/or a location of intermediate data corresponding to the visibility data.

For example, the bitstream structure information may further include but is not limited to a quantity of probes, a length and a data format of the intermediate data corresponding to the illumination data, an execution sequence of data form conversion types corresponding to the illumination data, a length and a data format of the intermediate data corresponding to the visibility data, an execution sequence of data form conversion types corresponding to the visibility data, a location, a length, and a data format of the first attribute data, a location, a length, and a data format of the second attribute data, and the like. This is not limited in the present disclosure. The data form conversion types may include various first manner rearrangement types (for example, discarding of the data of the some channels, the channel splitting, the precision conversion, and the dimension conversion), various normalization types (for example, adaptive normalization, fixed parameter normalization, min-max normalization, and z-score (standard score) normalization), various domain conversion types (for example, the conversion from the linear domain to the non-linear domain, the conversion from the RGB domain to the YUV domain, the conversion from the RGB domain to the XYZ domain, the conversion from the RGB domain to the Lab domain, and the conversion from the picture domain to the transform domain), various quantization types (for example, the uniform quantization and the non-uniform quantization), a second manner rearrangement type like padding data to the YUV plane, and the like. This is not limited in the present disclosure. It should be understood that the bitstream structure information may include more or less information than the foregoing information. This is not limited in the present disclosure. In addition, the bitstream may alternatively not include the bitstream structure information. This may be specifically set based on a requirement. This is not limited in the present disclosure either.

According to the first aspect or any one of the foregoing implementations of the first aspect, when the probe data includes the illumination data and the visibility data, the method further includes: determining, based on a data amount of the illumination data, a data amount of the visibility data, and a preset bit rate, a first target bit rate corresponding to the illumination data and a second target bit rate corresponding to the visibility data. The encoding the intermediate data to obtain a corresponding bitstream includes: encoding, based on the first target bit rate, the intermediate data corresponding to the illumination data, and encoding, based on the second target bit rate, the intermediate data corresponding to the visibility data, to obtain the bitstream.

For example, a ratio of the first target bit rate to the second target bit rate may be determined based on the data amount of the illumination data and the data amount of the visibility data. In this way, appropriate bit rates may be allocated to the illumination data and the visibility data. In comparison with a case in which the ratio of the target bit rate corresponding to the illumination data to the target bit rate corresponding to the visibility data is fixed, in the present disclosure, the rendering effect can be improved when bitstreams are the same.

According to the first aspect or any one of the foregoing implementations of the first aspect, when the probe data includes the illumination data and the visibility data, the method further includes: determining, based on the data amount of the illumination data, the data amount of the visibility data, and channel feedback information, an encoding scheme corresponding to the illumination data and an encoding scheme corresponding to the visibility data. The encoding scheme includes intra-frame encoding or inter-frame encoding. The encoding the intermediate data to obtain a corresponding bitstream includes: encoding, by using the encoding scheme corresponding to the illumination data, the intermediate data corresponding to the illumination data, and encoding, by using the encoding scheme corresponding to the visibility data, the intermediate data corresponding to the visibility data, to obtain the bitstream. In this way, a bitstream size and the rendering effect can be balanced.

For example, the intra-frame encoding is an encoding scheme in which only information about a current frame is used when the current frame is encoded. For example, intra-frame encoding of a probe data group may be completed through HEVC intra-frame encoding. For example, the inter-frame encoding is an encoding scheme in which information about a non-current frame is used when a current frame is encoded. For example, inter-frame encoding of a probe data group may be completed through HEVC inter-frame encoding.

According to a second aspect, an embodiment of the present disclosure provides a first device. The first device includes: a data obtaining module configured to obtain probe data, where the probe data corresponds to one or more probes in a 3D scene, and the probe data is used by a second device to determine shading effect of an object in the 3D scene in a rendering process; a data form conversion module configured to perform data form conversion on the probe data to obtain intermediate data, where the data form conversion includes domain conversion; and an encoding module configured to encode the intermediate data to obtain a corresponding bitstream.

According to the second aspect, the data form conversion module includes: a domain conversion module configured to: perform first processing on the probe data to obtain converted data, where the first processing is domain conversion; or perform second processing on the converted data to obtain the intermediate data, where the second processing is the domain conversion; a quantization module configured to: perform first processing on the probe data to obtain converted data, where the first processing is quantization; or perform second processing on the converted data to obtain the intermediate data, where the second processing is the quantization; and a rearrangement module configured to: perform first processing on the probe data to obtain converted data, where the first processing is first manner rearrangement; or perform second processing on the converted data to obtain the intermediate data, where the second processing is the first manner rearrangement.

According to the second aspect or any one of the foregoing implementations of the second aspect, the domain conversion module is further configured to perform third processing on the probe data before performing first processing on the probe data. The third processing is the domain conversion.

The quantization module is further configured to perform third processing on the probe data before performing first processing on the probe data. The third processing is the quantization.

The rearrangement module is further configured to perform third processing on the probe data before performing first processing on the probe data. The third processing is the first manner rearrangement.

According to the second aspect or any one of the foregoing implementations of the second aspect, the rearrangement module is further configured to: after performing second processing on the converted data and before obtaining the intermediate data, perform second manner rearrangement on the data obtained through second processing to obtain the intermediate data. The second manner rearrangement is padding the data obtained through second processing to a YUV plane.

According to the second aspect or any one of the foregoing implementations of the second aspect, when the probe data is illumination data, and when the illumination data includes a plurality of channels, the first manner rearrangement includes at least one of the following: discarding data of some channels, converting the illumination data to preset precision, or performing dimension conversion on the illumination data.

According to the second aspect or any one of the foregoing implementations of the second aspect, when the probe data is visibility data, and when the visibility data includes a plurality of channels, the first manner rearrangement includes at least one of the following: performing channel splitting, converting the visibility data to preset precision, or performing dimension conversion on the visibility data.

According to the second aspect or any one of the foregoing implementations of the second aspect, the domain conversion includes at least one of the following: conversion from a non-normalized domain to a normalized domain, conversion from a linear domain to a non-linear domain, conversion from an RGB domain to a YUV domain, conversion from an RGB domain to an XYZ domain, conversion from an RGB domain to a Lab domain, and conversion from a picture domain to a transform domain.

According to the second aspect or any one of the foregoing implementations of the second aspect, the probe data is represented by a two-dimensional picture, or a spherical harmonic function basis coefficient, or a spherical wavelet basis coefficient.

According to the second aspect or any one of the foregoing implementations of the second aspect, the encoding module is further configured to encode attribute data of the one or more probes to obtain the bitstream. The attribute data includes first attribute data for the data form conversion and/or second attribute data used in the rendering process.

According to the second aspect or any one of the foregoing implementations of the second aspect, when the probe data includes the illumination data and the visibility data, the bitstream includes bitstream structure information, and the bitstream structure information includes a location of intermediate data corresponding to the illumination data and/or a location of intermediate data corresponding to the visibility data.

According to the second aspect or any one of the foregoing implementations of the second aspect, the first device further includes: a bitstream load balancing module configured to: when the probe data includes the illumination data and the visibility data, determine, based on a data amount of the illumination data, a data amount of the visibility data, and a preset bit rate, a first target bit rate corresponding to the illumination data and a second target bit rate corresponding to the visibility data.

The encoding module is specifically configured to: encode, based on the first target bit rate, the intermediate data corresponding to the illumination data, and encode, based on the second target bit rate, the intermediate data corresponding to the visibility data, to obtain the bitstream.

According to the second aspect or any one of the foregoing implementations of the second aspect, the first device further includes:

The bitstream load balancing module is configured to: when the probe data includes the illumination data and the visibility data, determine, based on the data amount of the illumination data, the data amount of the visibility data, and channel feedback information, an encoding scheme corresponding to the illumination data and an encoding scheme corresponding to the visibility data. The encoding scheme includes intra-frame encoding or inter-frame encoding.

The encoding module is specifically configured to: encode, by using the encoding scheme corresponding to the illumination data, the intermediate data corresponding to the illumination data, and encode, by using the encoding scheme corresponding to the visibility data, the intermediate data corresponding to the visibility data, to obtain the bitstream.

The second aspect and any one of the implementations of the second aspect correspond to the first aspect and any one of the implementations of the first aspect respectively. For technical effect corresponding to the second aspect and any one of the implementations of the second aspect, refer to technical effect corresponding to the first aspect and any one of the implementations of the first aspect.

According to a third aspect, an embodiment of the present disclosure provides an electronic device, including a memory and a processor. The memory is coupled to the processor, and the memory stores program instructions. When the program instructions are executed by the processor, the electronic device is enabled to perform the encoding method according to the first aspect or any possible implementation of the first aspect.

The third aspect and any one of the implementations of the third aspect correspond to the first aspect and any one of the implementations of the first aspect respectively. For technical effect corresponding to the third aspect and any one of the implementations of the third aspect, refer to technical effect corresponding to the first aspect and any one of the implementations of the first aspect.

According to a fourth aspect, an embodiment of the present disclosure provides a chip, including one or more interface circuits and one or more processors. The interface circuit is configured to: receive a signal from a memory of an electronic device, and send the signal to the processor, where the signal includes computer instructions. When the processor executes the computer instructions, the electronic device is enabled to perform the encoding method according to the first aspect or any possible implementation of the first aspect.

The fourth aspect and any one of the implementations of the fourth aspect correspond to the first aspect and any one of the implementations of the first aspect respectively. For technical effect corresponding to the fourth aspect and any one of the implementations of the fourth aspect, refer to technical effect corresponding to the first aspect and any one of the implementations of the first aspect.

According to a fifth aspect, an embodiment of the present disclosure provides a computer-readable storage medium. The computer-readable storage medium stores a computer program, and when the computer program is run on a computer or a processor, the computer or the processor is enabled to perform the encoding method according to the first aspect or any possible implementation of the first aspect.

The fifth aspect and any one of the implementations of the fifth aspect correspond to the first aspect and any one of the implementations of the first aspect respectively. For technical effect corresponding to the fifth aspect and any one of the implementations of the fifth aspect, refer to technical effect corresponding to the first aspect and any one of the implementations of the first aspect.

According to a sixth aspect, an embodiment of the present disclosure provides a computer program product. The computer program product includes a software program, and when the software program is executed by a computer or a processor, the computer or the processor is enabled to perform the encoding method according to the first aspect or any possible implementation of the first aspect.

The sixth aspect and any one of the implementations of the sixth aspect correspond to the first aspect and any one of the implementations of the first aspect respectively. For technical effect corresponding to the sixth aspect and any one of the implementations of the sixth aspect, refer to technical effect corresponding to the first aspect and any one of the implementations of the first aspect.

According to a seventh aspect, the present disclosure provides a computer-readable storage medium storing a bitstream. The bitstream is obtained by using the encoding method according to the first aspect or any possible implementation of the first aspect.

The seventh aspect and any one of the implementations of the seventh aspect correspond to the first aspect and any one of the implementations of the first aspect respectively. For technical effect corresponding to the seventh aspect and any one of the implementations of the seventh aspect, refer to technical effect corresponding to the first aspect and any one of the implementations of the first aspect.

According to an eighth aspect, the present disclosure provides a bitstream. The bitstream is obtained by using the encoding method according to the first aspect or any possible implementation of the first aspect. Optionally, the bitstream may be stored in a computer-readable storage medium, or transmitted in a form of an electromagnetic signal.

The eighth aspect and any one of the implementations of the eighth aspect correspond to the first aspect and any one of the implementations of the first aspect respectively. For technical effect corresponding to the eighth aspect and any one of the implementations of the eighth aspect, refer to technical effect corresponding to the first aspect and any one of the implementations of the first aspect.

DESCRIPTION OF EMBODIMENTS

Figure 1A:
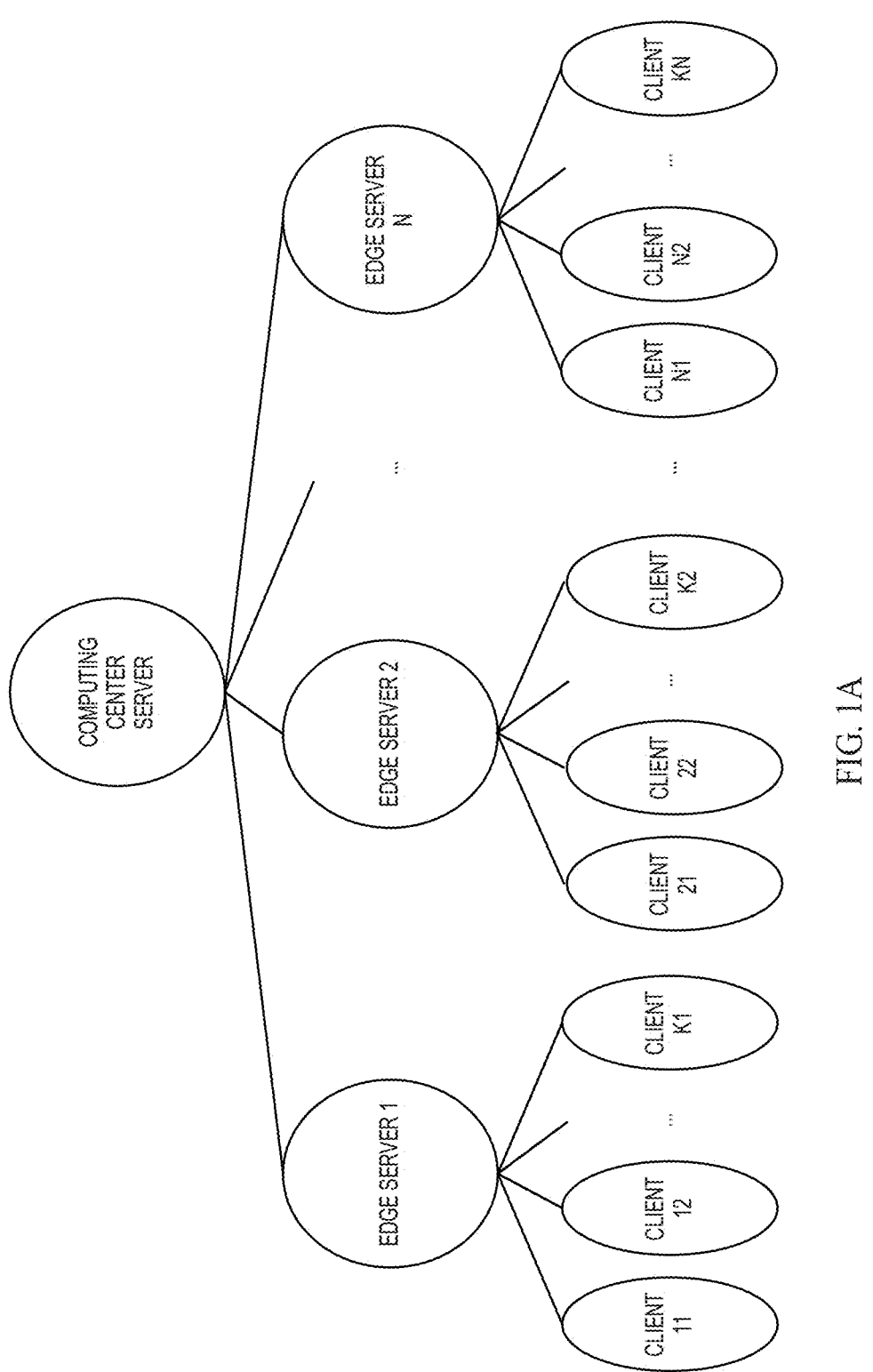
FIG. 1A is a diagram of an example of a system framework.

The following clearly and completely describes the technical solutions in embodiments of the present disclosure with reference to the accompanying drawings in embodiments of the present disclosure. It is clearly that the described embodiments are some but not all of embodiments of the present disclosure. All other embodiments obtained by a person of ordinary skill in the art based on embodiments of the present disclosure without creative efforts shall fall within the protection scope of the present disclosure.

The term "and/or" in this specification describes only an association relationship for describing associated objects and represents that three relationships may exist. For example, A and/or B may represent the following three cases: Only A exists, both A and B exist, and only B exists.

In the specification and claims of embodiments of the present disclosure, the terms "first", "second", and the like are intended to distinguish between different objects but do not indicate a specific order of the objects. For example, a first target object, a second target object, and the like are used to distinguish between different target objects, but are not used to describe a specific order of the target objects.

In embodiments of the present disclosure, a word like "example" or "for example" is used for representing an example, an example illustration, or description. Any embodiment or design solution described as "example" or "for example" in embodiments of the present disclosure is not to be construed as being more preferred or advantageous than another embodiment or design solution. Exactly, use of the word like "example" or "for example" is intended to present a related concept in a specific manner.

In the description of embodiments of the present disclosure, "a plurality of" means two or more than two unless otherwise specified. For example, a plurality of processing units refer to two or more processing units, and a plurality of systems refer to two or more systems.

For example, embodiments of the present disclosure may be applied to an N-end (that is, N devices) synergy rendering scene, where N is an integer greater than 1.

In a possible scene, one device may generate rendering input information (the rendering input information may include one or more 3D models, including a human model and/or an object model), probe data, and the like, where this is not limited in the present disclosure, and in the present disclosure, an example in which the rendering input information is the probe data is used for description). The probe data is distributed to the other N−1 devices. After receiving the probe data, the other N−1 devices may determine shading effect of an object (corresponding to the 3D model) in the 3D scene based on the probe data in a rendering process. After rendering is completed, a rendered picture may be obtained.

In a possible scene, N1 (a value range of N1 is from 2 to N, where N1 may be equal to 2 or N, and N1 is an integer) devices may generate the probe data in synergy. Each of the N1 devices generates a part of the probe data. Then, each of the N1 devices distributes the part of the probe data generated by the device to the other N−1 devices. After receiving the probe data, the N1 devices may determine, in a rendering process, shading effect of an object in a 3D scene based on the received probe data and parts of probe data generated by the N1 devices. After rendering is completed, a rendered picture may be obtained. After receiving the probe data, other N−N1 devices may determine the shading effect of the object in the 3D scene based on the received probe data in the rendering process. After rendering is completed, the rendered picture may be obtained.

For ease of description, a device that generates the probe data in the N-end synergy rendering scene may be referred to as a first device, and a device that is used for rendering and that determines the shading effect of the object in the 3D scene based on the probe data in the rendering process may be referred to as a second device. A same device may be the first device or the second device. This is not limited in the present disclosure. The first device may be a server, or may be a terminal. The second device may be a terminal.

FIG. 1A is a diagram of an example of a system framework. In an embodiment in FIG. 1A, the first device is a computing center server disposed on a cloud, and the second device is a client. FIG. 1A is a diagram of an example of a framework of a device-cloud synergy rendering system.

Refer to FIG. 1A. For example, the device-cloud synergy rendering system may include the computing center server, edge servers, and clients. There may be n (n is an integer greater than 1) edge servers, and k1+k2+ . . . +kn clients, where k1, k2, . . . , and kn are all positive integers. The computing center server is connected to the n edge servers, and each edge server is connected to at least one client. As shown in FIG. 1A, an edge server 1 is connected to k1 clients: a client 11, a client 12, . . . , and a client k1; an edge server 2 is connected to k2 clients: a client 21, a client 22, . . . , and a client k2; . . . ; and an edge server n is connected to kn clients: a client n1, a client n2, . . . , and a client kn.

For example, the client may access a network via a wireless access point like a base station or a Wi-Fi access point, and communicate with the edge server over the network. Alternatively, the client may communicate with the edge server through a wired connection. The edge server may also access the network via the wireless access point like the base station or the Wi-Fi access point, and communicate with the computing center server over the network. Alternatively, the edge server may communicate with the computing center server through the wired connection.

For example, the computing center server may be one server, a server cluster including a plurality of servers, or another distributed system. This is not limited in the present disclosure.

For example, a quantity n of edge servers is not limited in the present disclosure, and may be specifically set based on an actual application scenario. This is not limited in the present disclosure. In a possible scene, some clients may not be connected to the edge server, but are directly connected to the computing center server. In another possible scene, all the clients are not connected to the edge server, but are directly connected to the computing center server.

For example, a quantity of clients connected to each edge server is not limited in the present disclosure, and may be specifically set based on the actual application scenario. In addition, quantities of clients connected to all the edge servers may be the same or different (in other words, k1, k2, . . . , and kn may be equal or may be unequal), and may be specifically set based on the actual application scenario. This is not limited in the present disclosure.

For example, the clients may include but are not limited to a mobile phone, a personal computer (PC), a notebook computer, a tablet computer, a smart television, a mobile Internet device (MID), a wearable device (like a smart watch, smart glasses, or a smart helmet), a VR device, an augmented reality (AR) device, a wireless electronic device in industrial control, a wireless electronic device in self-driving, a wireless electronic device in remote medical surgery, a wireless electronic device in a smart grid, a wireless electronic device in transportation safety, a wireless electronic device in a smart city, a wireless electronic device in a smart home, and the like. A specific form of the client is not specifically limited in the following embodiments.

It should be understood that the framework of the device-cloud synergy rendering system shown in FIG. 1A is merely an example of the framework of the device-cloud synergy rendering system in the present disclosure. In the device-cloud synergy rendering system in the present disclosure, the computing center server and the edge server may be a same server. Alternatively, the device-cloud synergy rendering system in the present disclosure does not include the edge server, but the computing center server is connected to each client. This is not limited in the present disclosure. In the present disclosure, the framework of the device-cloud synergy rendering system shown in FIG. 1A is used as an example for description.

For example, the computing center server may be configured to: generate probe data, for example, generate probe data shared by all the clients and probe data personalized by each client.

For example, the edge server may be configured to: distribute the probe data, and generate the personalized probe data of the client connected to the edge server. For example, when the computing center server generates the probe data shared by all the clients and the personalized probe data of each client, the edge server may distribute the probe data generated by the computing center server. For another example, when the computing center server generates only the probe data shared by all the clients, the edge server may generate the probe data personalized by the client connected to the edge server, and then may distribute the probe data generated by the computing center server and the probe data generated by the edge server.

For example, the client may be used for rendering and configured to display a rendered picture. In a rendering process, shading effect of an object in a 3D scene may be determined based on the probe data.

For example, all N-end synergy rendering scenes such as cloud game, cloud exhibition, indoor decoration, clothing design, and architectural design scenes may be implemented by using the framework of the device-cloud synergy rendering system shown in FIG. 1A.

For example, in the cloud game scene, after receiving an angle of view switching instruction sent by the client 11, the computing center server may generate probe data of the game scene corresponding to a target angle of view, and then send the probe data to the edge server 1. The edge server 1 sends the probe data to the client 11. After receiving the probe data, the client 11 may perform rendering; determine, based on the received probe data in the rendering process, shading effect of an object in the game scene corresponding to the target angle of view; and after completing rendering, obtain and display a picture of the game scene corresponding to the target angle of view.

For example, in the indoor decoration scene, after receiving a furniture adding instruction sent by the client 21, the computing center server may generate probe data corresponding to a living room scene to which target furniture is added, and then send the probe data to the edge server 2. The edge server 2 sends the probe data to the client 21. After receiving the probe data, the client 21 may perform rendering; determine, based on the received probe data in the rendering process, shading effect of an object in the living room scene to which the target furniture is added; and after completing rendering, obtain and display a picture of the living room to which the target furniture is added.

For ease of subsequent description, the following describes a process in which the computing center server generates the probe data and a process in which the client determines the shading effect of the object in the 3D scene based on the probe data in the rendering process.

The process in which the computing center server generates the probe data is as follows:

For example, the rendering process of the computing center server may be as follows: loading a 3D model (which may include a human model or an object model) into the 3D scene (which may also be referred to as a 3D scene) (in this way, the 3D model may be converted to the object in the 3D scene), and rendering the object in the 3D scene to obtain a current frame (that is, the rendered picture). To simulate the shading effect of the object in the 3D scene after a light ray is reflected for a plurality of times in the 3D scene, in a process of rendering the object in the 3D scene, a plurality of probes may be placed in the 3D scene, and an ambient environment is detected via the probes, to obtain the probe data. Then, the shading effect of the object in the 3D scene is determined based on the probe data.

Figure 1B:
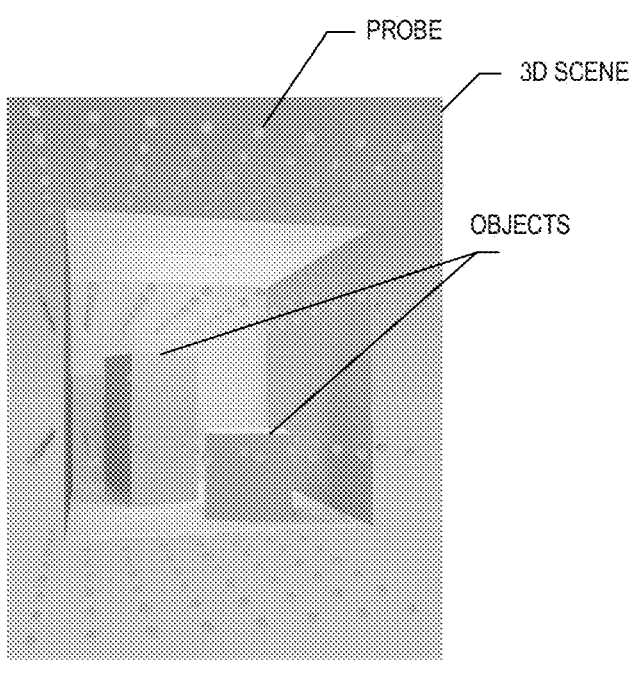
FIG. 1B is a diagram of an example of probe distribution in a 3D scene.

FIG. 1B is a diagram of an example of probe distribution in a 3D scene. Each small ball in FIG. 1B represents a probe. In an embodiment in FIG. 1B, the probe is a dynamic diffuse global illumination (DDGI) probe.

Refer to FIG. 1B. For example, a location at which each probe is placed in the 3D scene and a location relationship between each probe and another probe may be set based on a requirement. This is not limited in the present disclosure. For example, in FIG. 1B, distances between each probe and six surrounding probes of the probe in six directions (the right above direction, the right below direction, the right front direction, the right rear direction, the right left direction, and the right direction) are equal. In addition, a quantity of probes placed in the 3D scene may also be set based on the requirement. This is not limited in the present disclosure either.

After a plurality of probes are placed in the 3D scene, corresponding attribute data (the attribute data is used in a rendering process) may be configured for each probe based on a scene requirement. The attribute data includes but is not limited to: a type of a probe (like a reflection probe or the DDGI probe), an enabling identifier of the probe, a location of the probe, a location offset of the probe (for example, after the probes are placed in a preset manner, initial locations of the probes may be obtained; to obtain better shading effect, locations of some probes may be adjusted, so that for these probes, offsets between adjusted locations and the initial locations may be referred to as location offsets of the probes; for example, after the probe is placed in the manner shown in FIG. 1B, the distances between each probe and the six surrounding probes of the probe are all equal; and if a location of a probe is adjusted, distances between the probe and the six surrounding probes of the probe are unequal), and the like. This is not limited in the present disclosure.

For example, after the plurality of probes are placed in the 3D scene, each probe may detect an ambient environment centered on the probe, that is, detect features of surrounding objects centered on the probe in the 3D scene, and record these features as environment data of the probe. The environment data may include illumination data, color data, visibility data, a normal direction, texture coordinates, material information, and the like. The illumination data may be used to describe emergent illumination of the surrounding object of the probe. The visibility data may be used to describe distribution (which may also be referred to as depth distribution) of the distances between the surrounding objects of the probe and the probe, and may include but is not limited to distance data, a variance of the distance data, a square of the distance data, and the like. This is not limited in the present disclosure. The following uses an example in which the illumination data and the visibility data are generated for description.

For example, illumination data and visibility data corresponding to each probe may be generated according to a DDGI algorithm. The following uses a probe in a current frame as an example to describe a process of generating the illumination data and the visibility data of the probe. First, several light rays emitted from the probe are sampled, and first intersection points of the several light rays and objects in the 3D scene are calculated. Then, a distance between the probe and the first intersection point of each of the several light rays of the probe and the objects in the 3D scene is calculated to obtain initial distance data. Illumination at the first intersection points of the objects in the 3D scene and the several light rays is calculated to obtain initial illumination data. Subsequently, the initial distance data in a discrete domain may be converted to spherical data in a continuous domain. Specifically, filtering processing may be performed, on a sphere, on the initial distance data by using a $\cos^k$ kernel function (k is a positive integer) to obtain candidate distance data. In addition, the initial distance data in the discrete domain may be converted to the spherical data in the continuous domain. Specifically, filtering processing may be performed, on the sphere, on a square of the initial distance data by using the $\cos^k$ kernel function (k is a positive integer) to obtain a square of the candidate distance data. In addition, the initial illumination data in the discrete domain may be converted to spherical data in the continuous domain. Specifically, filtering processing may be performed, on the sphere, on the initial illumination data by using a cos kernel function to obtain candidate illumination data. Then, weighted calculation is performed on the candidate distance data of the probe and distance data of the probe in a previous frame to obtain distance data of the probe in the current frame. Weighted calculation is performed on the square of the candidate distance data of the probe and a square of the distance data of the probe in the previous frame to obtain a square of the distance data of the probe in the current frame. Weighted calculation is performed on the candidate illumination data of the probe and illumination data of the probe in the previous frame to obtain illumination data of the probe in the current frame. In this way, illumination data and visibility data of all probes in the current frame may be obtained.

For example, the illumination data and the visibility data of each probe may be represented by a two-dimensional picture, or a spherical harmonic function basis coefficient, or a spherical wavelet basis coefficient. This is not limited in the present disclosure.

It should be noted that, it is assumed that the 3D scene includes M (M is a positive integer) probes. M1 probes have any one of the illumination data, the visibility data, and the attribute data, M2 probes have any two of the illumination data, the visibility data, and the attribute data, M3 probes have the illumination data, the visibility data, and the attribute data, and the M4 probes do not have the probe data. M1+M2+M3+M4=M, M1, M2, M3, and M1 are all integers, and values of M1, M2, M3, and M4 may be set based on a requirement. This is not limited in the present disclosure.

For example, the probe data may include the attribute data and the environment data that are used in the rendering process.

A process in which the client determines the shading effect of the object in the 3D scene based on the probe data in the rendering process is as follows:

For example, when the client is in the rendering process, the probe data may be used to calculate the shading effect of the object in the 3D scene. Specifically, when each pixel is rendered, coordinates of 3D space corresponding to the pixel are first obtained, and then eight probes surrounding the coordinates are searched for. Next, a weight contributed by each probe to the pixel is calculated based on visibility data of the probe, that is, whether the probe and the 3D coordinates of the probe are mutually visible is determined based on a distance. If the probe and the 3D coordinates of the probe are mutually visible, the weight is 0. If the probe and the 3D coordinates of the probe are not mutually visible, the weight contributed the probe is calculated based on the distance, a square of the distance, and a location of the probe. Then, the contributed weight is used to perform weighted averaging on the illumination data of the probe to obtain a shading result of the pixel.

Because an amount of probe data is large, a computing center server can compress the probe data before sending the probe data to the client, to reduce bandwidth usage of the server and the client and a rendering delay of the client.

Figure 2A:
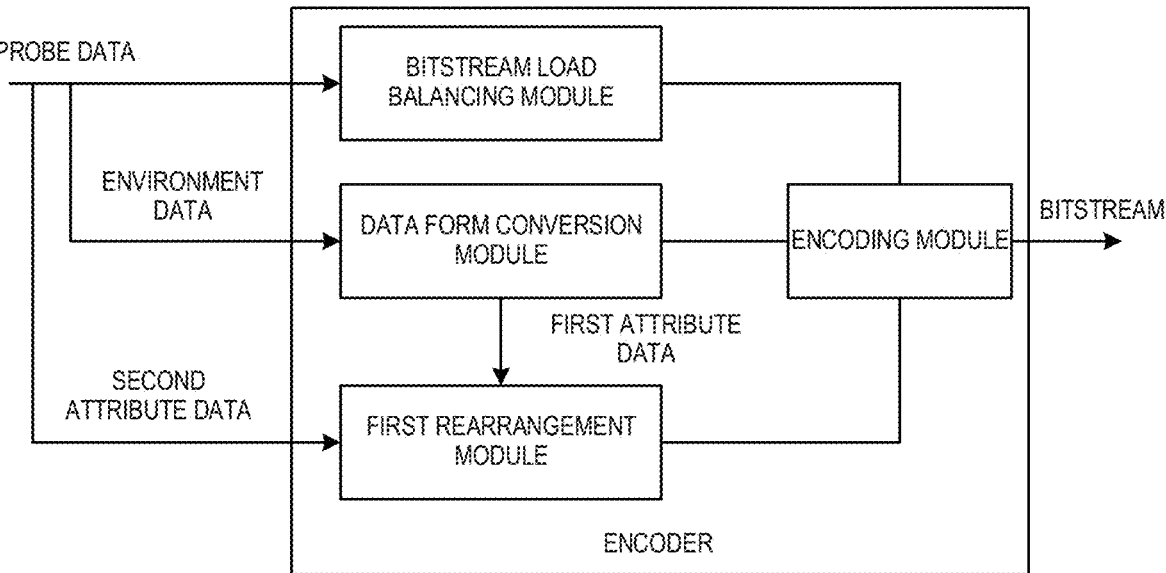
FIG. 2A is a diagram of an example of an encoding framework.

FIG. 2A is a diagram of an example of an encoding framework.

Refer to FIG. 2A. For example, the encoder may include a bitstream load balancing module, a data form conversion module, a first rearrangement module, and an encoding module.

For example, the bitstream load balancing module may be configured to determine a target bit rate and an encoding scheme (for example, intra-frame encoding or inter-frame encoding) of probe data.

For example, the data form conversion module may be configured to: perform data form conversion on environment data to convert the environment data to a more compact representation form; or increase a quantity of bits occupied in a bitstream by data of higher importance required in a rendering process.

For example, the first rearrangement module may be configured to rearrange attribute data of a probe. The attribute data of the probe may include attribute data (referred to as first attribute data) used for the data form conversion and attribute data (referred to as second attribute data) used in the rendering process.

For example, the encoding module is configured to perform encoding to obtain the bitstream.

It should be noted that steps performed by the bitstream load balancing module, the data form conversion module, and the first rearrangement module are steps in an encoding procedure of the encoder.

It should be understood that FIG. 2A is merely an example of the encoder in the present disclosure, and the encoder in the present disclosure may have fewer modules than those in FIG. 2A. For example, the encoder includes the bitstream load balancing module, the data form conversion module, and the encoding module; for another example, the encoder includes the data form conversion module, the first rearrangement module, and the encoding module; for still another example, the encoder includes the data form conversion module and the encoding module; and the like. In addition, the encoder in the present disclosure may have more modules than those in FIG. 2A. This is not limited in the present disclosure.

It should be understood that the bitstream load balancing module, the data form conversion module, the first rearrangement module, and the encoding module in FIG. 2A may be modules independent of each other, or any two or more of the modules are a whole. This is not limited in the present disclosure. In addition, the bitstream load balancing module, the data form conversion module, the first rearrangement module, and the encoding module are logic modules. The encoder may be alternatively divided into other modules. Alternatively, these modules use other names. This is not limited in the present disclosure either.

It should be understood that in a possible manner, the encoder includes only the encoding module, the bitstream load balancing module, the data form conversion module, and the first rearrangement module that may be independent of the encoder. This is not limited in the present disclosure. In the present disclosure, the encoder in FIG. 2A is used as an example for description.

Figure 2B:
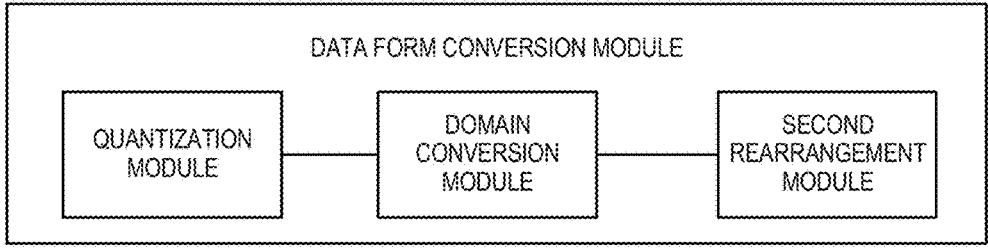
FIG. 2B is a diagram of an example of a structure of a data form conversion module.

FIG. 2B is a diagram of an example of a structure of a data form conversion module.

Refer to FIG. 2B. For example, the data form conversion module may include a quantization module, a domain conversion module, and a second rearrangement module.

For example, the quantization module may be configured to quantize probe data.

For example, the domain conversion module may be configured to perform domain conversion on the probe data.

For example, the domain conversion may refer to converting a representation form of data from one domain to another domain. Domains may be classified from different perspectives based on a requirement. Examples are as follows:

From a perspective of normalization, the domains may be classified into a normalized domain and a non-normalized domain.

From a perspective of colors, the domains may be classified into an RGB domain, a YUV domain, an XYZ domain, and a Lab domain.

From a perspective of a numerical relationship, the domains may be classified into a linear domain and a non-linear domain. The non-linear domain may be an exponential domain, a PQ domain, an HLG domain, or the like.

From a perspective of a numerical representation form, the domains may be classified into a picture domain and a transform domain. For example, the picture domain may be a domain represented by a picture. For example, the transform domain may be a domain represented by a transform basis function and a corresponding transform coefficient.

For data Y(t) in the transform domain, approximation may be performed on the data Y(t) by using x transform bases e_1(t) to e_x(t), so that the data Y(t) is approximately equal to a sum of products of the x transform bases and corresponding transform coefficients. The transform bases include but are not limited to a spherical harmonic function basis, a spherical wavelet basis, an eigenvector, and the like. This is not limited in the present disclosure.

For example, the second rearrangement module may be configured to rearrange the data.

It should be understood that FIG. 2B is merely an example of the data form conversion module in the present disclosure. The data form conversion module in the present disclosure may have fewer modules than those in FIG. 2B. For example, the data form conversion module includes only the domain conversion module. For another example, the data form conversion module includes only the quantization module and the domain conversion module. For still another example, the data form conversion module includes only the domain conversion module and the second rearrangement module. This is not limited in the present disclosure. In addition, the data form conversion module in the present disclosure may include more modules than those in FIG. 2B. This is not limited in the present disclosure either.

It should be understood that the quantization module, the domain conversion module, and the second rearrangement module in FIG. 2B may be modules independent of each other, or any two or more of the modules are a whole. This is not limited in the present disclosure. In addition, the quantization module, the domain conversion module, and the second rearrangement module are logic modules. The data form conversion module may be alternatively divided into other modules. Alternatively, these modules use other names. This is not limited in the present disclosure either.

The following describes an example of an encoding process of a first device.

Figure 3A:
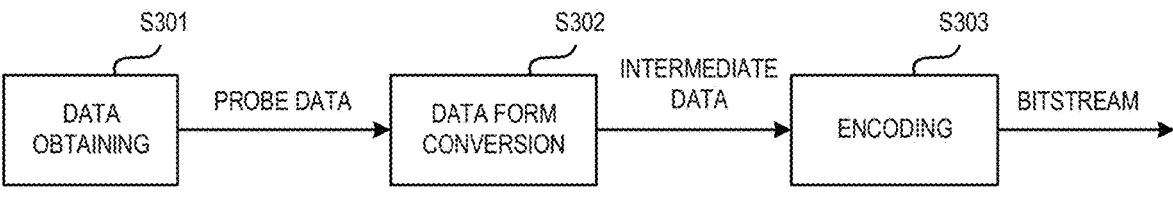
FIG. 3A-FIG. 3G are diagrams of examples of an encoding procedure.

FIG. 3A-FIG. 3G are diagrams of an example of an encoding procedure. In FIG. 3A, the encoding procedure may include S301: Obtain data; S302: Perform data form conversion; and S303: Perform encoding.

S301: Obtain the data, that is, obtain probe data.

For example, in an N-end synergy rendering scenario, the first device may generate probe data of K (K is a positive integer, and K is less than or equal to M) probes in a current frame based on the foregoing description, and then may input the probe data of the K probes to an encoder. In this way, the encoder can obtain the probe data of the K probes, and then encode the probe data of the K probes with reference to the following S302 and S303 to obtain a bitstream corresponding to the probe data.

For example, in an embodiment in FIG. 3A, probe data of any probe may include illumination data and/or visibility data.

S302: Perform data form conversion, that is, perform data form conversion on the probe data obtained in S301 to obtain intermediate data.

For example, after the probe data of the K probes is received, data form conversion may be performed on the probe data of the K probes, that is, the probe data of the K probes is converted from one data form to another data form. In this way, the probe data of the K probes can be converted to a more compact representation form, and this facilitates compression. Further, a bit rate can be reduced under same rendering effect. In addition, a quantity of bits occupied in the bitstream by data of higher importance required in a rendering process can be increased. In this way, the rendering effect is better under a same bit rate.

For example, the data form conversion may include domain conversion.

For example, the domain conversion may include at least one of the following: conversion from a non-normalized domain to a normalized domain, conversion from a linear domain to a non-linear domain, conversion from an RGB domain to a YUV domain, conversion from an RGB domain to an XYZ domain, conversion from an RGB domain to a Lab domain, and conversion from a picture domain to a transform domain. It should be understood that the present disclosure may further include another type of domain conversion. This is not limited in the present disclosure.

For example, the conversion from the non-normalized domain to the normalized domain is normalization. When the domain conversion is the conversion from the non-normalized domain to the normalized domain, the probe data of the K probes may be normalized based on a normalization parameter, to obtain the intermediate data corresponding to the probe data of the K probes. For example, the probe data of the K probes may be normalized to [0, 1]. In this case, the intermediate data corresponding to the probe data of the K probes belongs to [0, 1].

The normalization may include but is not limited to adaptive normalization, fixed parameter normalization, min-max normalization, z-score normalization, and the like. This is not limited in the present disclosure. It should be understood that the present disclosure may further include another type of normalization. This is not limited in the present disclosure.

In this way, the probe data is converted to a fixed range by normalizing the probe data, so that values of the probe data are more centralized, that is, the probe data is converted to the more compact representation form, and this facilitates compression. In this way, the bit rate can be reduced under the same rendering effect.

For example, the obtained probe data of the K probes is data in the linear domain. When the non-linear domain is an exponential domain, conversion from the linear domain to the exponential domain may be performed on the probe data of the K probes based on an exponential conversion parameter, to obtain the intermediate data corresponding to the probe data of the K probes. In this case, the intermediate data corresponding to the probe data of the K probes belongs to the exponential domain.

For example, when the non-linear domain is a PQ domain, conversion from the linear domain to the PQ domain may be performed on the probe data of the K probes by using a PQ curve, to obtain the intermediate data corresponding to the probe data of the K probes. In this case, the intermediate data corresponding to the probe data of the K probes belongs to the PQ domain.

For example, when the non-linear domain is an HLG domain, conversion from the linear domain to the HLG domain may be performed on the probe data of the K probes by using an HLG curve, to obtain the intermediate data corresponding to the probe data of the K probes. In this case, the intermediate data corresponding to the probe data of the K probes belongs to the HLG domain.

In this case, conversion from the linear domain to the non-linear domain is performed on the probe data so that the quantity of bits occupied in the bitstream by the data of higher importance required in the rendering process may be increased. In this way, the rendering effect is better under the same bit rate.

For example, the obtained probe data of the K probes is data represented by RGB. In a possible manner, conversion from the RGB domain to the YUV domain may be performed on the probe data of the K probes by converting an RGB color space to a YUV 444 color space, to obtain the intermediate data corresponding to the probe data of the K probes. In this case, the intermediate data corresponding to the probe data of the K probes is represented by YUV.

In a possible manner, conversion from the RGB domain to the YUV domain may be performed on the probe data of the K probes by converting an RGB color space to a YUV 420 color space, to obtain the intermediate data corresponding to the probe data of the K probes. In this case, the intermediate data corresponding to the probe data of the K probes is represented by YUV.

For example, conversion from the RGB domain to the XYZ domain may be performed on the probe data of the K probes by converting the RGB color space to an XYZ color space, to obtain the intermediate data corresponding to the probe data of the K probes. That is, the intermediate data corresponding to the probe data of the K probes is represented by XYZ.

For example, conversion from the RGB domain to the Lab domain may be performed on the probe data of the K probes by converting the RGB color space to a Lab color space, to obtain the intermediate data corresponding to the probe data of the K probes. That is, the intermediate data corresponding to the probe data of the K probes is represented by Lab.

In this way, redundancy of the probe data of the probes can be removed by performing conversion from the RGB domain to the YUV domain on the probe data of the K probes. Further, the bit rate can be reduced under the same rendering effect. Alternatively, conversion from the RGB domain to the XYZ domain/Lab domain is performed on the probe data of the K probes, so that the data can better meet human eye perception. Further, the rendering effect can be improved under the same bit rate.

For example, when the obtained probe data of the K probes is represented by a two-dimensional picture, the probe data of the K probes may be decomposed (for example, decomposed in a PCA (principal component analysis, principal component analysis) manner). In this case, probe data of each probe is approximately equal to a sum of products of x transform bases e_1(t) to e_x(t) and corresponding transform coefficients, to perform conversion from the picture domain to the transform domain on the probe data of the K probes.

For example, the probe data of each probe is theoretically equal to a sum of products of infinite or y transform bases and corresponding transform coefficients. However, in the present disclosure, only the sum of the products of the limited x (x<y) transform bases e_1(t) to e_x(t) and the corresponding transform coefficients is used, to approximately represent the probe data of each probe. In essence, a high-order basis and a corresponding coefficient are discarded. The high-order basis and the coefficient slightly affect the rendering effect. In this case, conversion from the picture domain to the transform domain is performed on the probe data, so that an amount of data that needs to be compressed can be reduced. Further, the bit rate can be reduced under the same rendering effect.

It should be understood that two or more types of domain conversion in the foregoing plurality of types of domain conversion may be used to implement data form conversion of the probe data. This is not limited in the present disclosure. When the two or more types of domain conversion are used to implement data form conversion of the probe data, an execution sequence and execution times of various types of domain conversion are not limited in the present disclosure.

For example, it is assumed that normalization and conversion from the picture domain to the transform domain are used to implement data form conversion of the probe data. In a possible manner, the probe data may be normalized, and conversion from the picture domain to the transform domain is performed on normalized probe data to obtain the intermediate data. In a possible manner, conversion from the picture domain to the transform domain may be performed on the probe data, and then the probe data in the transform domain is normalized to obtain the intermediate data.

For another example, it is assumed that normalization, conversion from the RGB domain to the YUV domain, and conversion from the linear domain to the exponential domain are used to implement data form conversion of the probe data. In a possible manner, the probe data may be normalized, conversion from the linear domain to the exponential domain is performed on normalized probe data, and then conversion from the RGB domain to the YUV domain is performed on the data in the exponential domain to obtain the intermediate data. In a possible manner, the probe data may be normalized, conversion from the RGB domain to the YUV domain is performed on normalized probe data, and conversion from the linear domain to the exponential domain is performed on the data in the YUV domain to obtain the intermediate data. In a possible manner, normalization may be performed on the probe data for a first time based on the normalization parameter, normalization is performed on normalized probe data for a second time based on another normalization parameter, probe data obtained through the two times of normalization is transformed from the RGB domain to the YUV domain, and conversion from the linear domain to the exponential domain is performed on the data in the YUV domain to obtain the intermediate data.

S303: Perform encoding, that is, encode the intermediate data obtained in S302 to obtain a corresponding bitstream.

For example, because 3D scenes of adjacent frames may be the same, probe data of the adjacent frames may be associated to some extent. Therefore, if a 3D scene of the current frame is the same as that of the previous frame, inter-frame encoding may be performed on the intermediate data corresponding to the probe data of the K probes in the current frame, to obtain the corresponding bitstream. In this way, the bit rate can be reduced while the rendering effect is ensured. If a 3D scene of the current frame is different from that of the previous frame, intra-frame encoding may be performed on the intermediate data corresponding to the probe data of the K probes in the current frame, to ensure the rendering effect.

For example, any video encoding scheme may be used to encode the intermediate data, to obtain the bitstream corresponding to the probe data. For example, HEVC encoding may be performed on the intermediate data to obtain the corresponding bitstream. For another example, AVC encoding may be performed on the intermediate data to obtain the corresponding bitstream. For still another example, VVC encoding may be performed on the intermediate data to obtain the corresponding bitstream. For yet another example, entropy encoding may be performed on the intermediate data to obtain the corresponding bitstream. For yet another example, the intermediate data may be alternatively encoded in another video encoding scheme like the AVS to obtain the corresponding bitstream.

It should be understood that the video encoding scheme for the intermediate data is not limited in the present disclosure. In addition, lossy compression or lossless compression may be performed on the intermediate data, and may be specifically set based on a requirement. This is not limited in the present disclosure either.

For example, when the probe data includes the illumination data, the bitstream obtained in S303 is a bitstream corresponding to the illumination data. When the probe data includes the visibility data, the bitstream obtained in S303 is a bitstream corresponding to the visibility data. When the probe data includes the illumination data and the visibility data, bitstreams obtained in S303 include the bitstream corresponding to the illumination data and the bitstream corresponding to the visibility data.

It should be noted that the step performed in S302 is a step in the encoding procedure.

In this way, the probe data is converted to the more compact representation form by performing data form conversion on the probe data. Thus, the bit rate can be reduced under the same rendering effect. Alternatively, data form conversion is performed on the probe data, to increase the quantity of bits occupied in the bitstream by the data of higher importance in the rendering process. Thus, the rendering effect is better under the same bit rate.

Figures 3B, 3C, 3D, 3E, 3F, 3G:
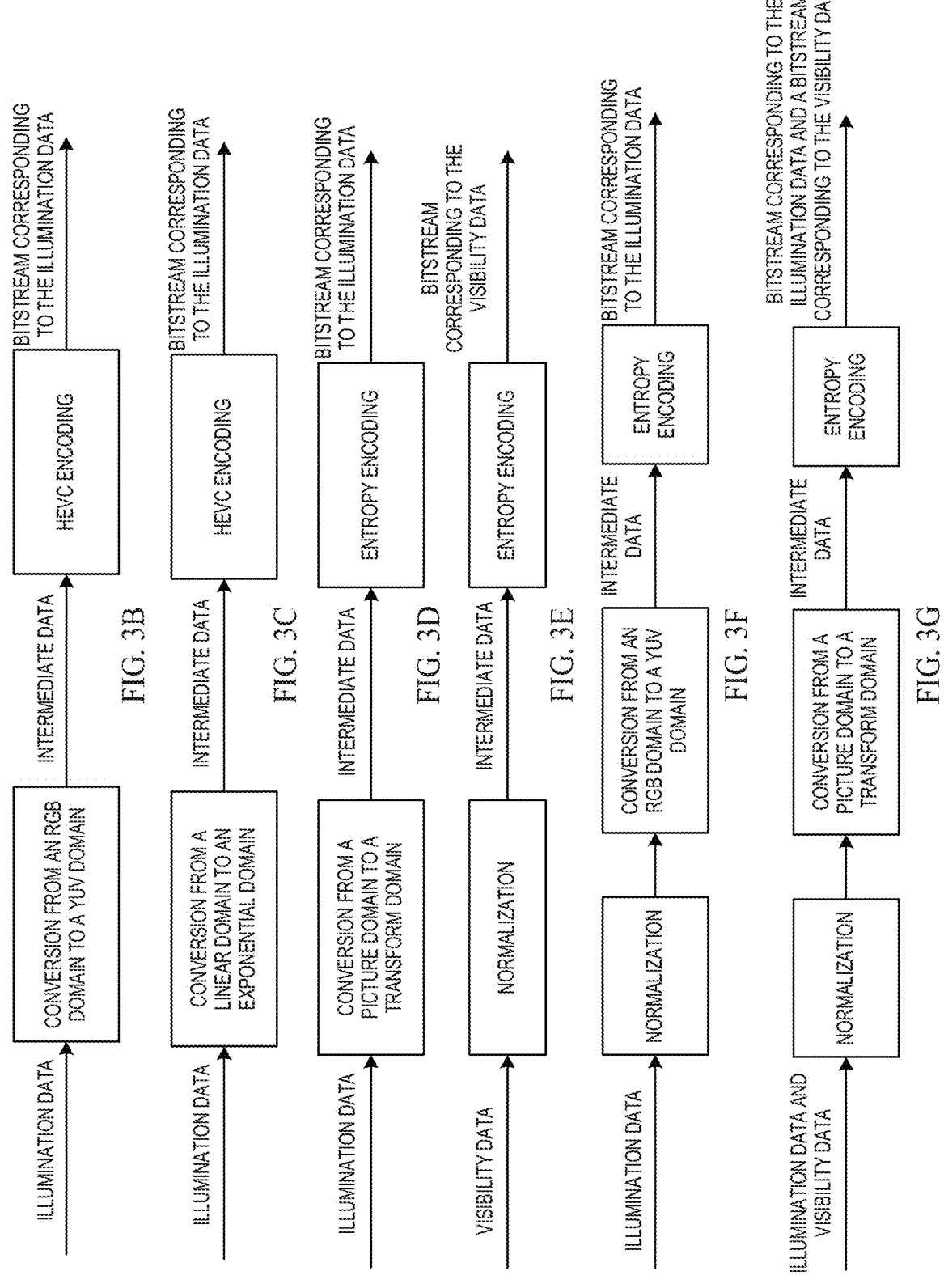

Refer to FIG. 3B. For example, the obtained probe data is the illumination data. Conversion from the RGB domain to the YUV domain is performed on the illumination data to obtain the intermediate data. Then, HEVC encoding (or other encoding) is performed on the intermediate data to obtain the bitstream corresponding to the illumination data.

Refer to FIG. 3C. For example, the obtained probe data is the illumination data. Conversion from the linear domain to the exponential domain is performed on the illumination data to obtain the intermediate data. Then, HEVC encoding (or other encoding) is performed on the intermediate data to obtain the bitstream corresponding to the illumination data.

Refer to FIG. 3D. For example, the obtained probe data is the illumination data. Conversion from the picture domain to the transform domain is performed on the illumination data to obtain the intermediate data. Then, entropy encoding (or other encoding) is performed on the intermediate data to obtain the bitstream corresponding to the illumination data.

Refer to FIG. 3E. For example, the obtained probe data is the visibility data. The visibility data is normalized to obtain the intermediate data. Then, entropy encoding (or other encoding) is performed on the intermediate data to obtain the bitstream corresponding to the visibility data.

Refer to FIG. 3F. For example, the obtained probe data is the illumination data. The illumination data is normalized, and conversion from the RGB domain to the YUV domain is performed on the illumination data to obtain the intermediate data. Then, entropy encoding (or other encoding) is performed on the intermediate data to obtain the bitstream corresponding to the illumination data.

Refer to FIG. 3G. For example, the obtained probe data includes the illumination data and the visibility data. The illumination data and the visibility data are normalized, and conversion from the picture domain to the transform domain is performed on the illumination data and the visibility data to obtain the intermediate data. Then, entropy encoding (or other encoding) is performed on the intermediate data to obtain the bitstream corresponding to the illumination data and the bitstream corresponding to the visibility data.

For example, the data form conversion may further include quantization and/or rearrangement. In this way, data form conversion may be performed on the probe data by combining the domain conversion and the quantization, by combining the domain conversion and the rearrangement, or by combining the domain conversion, and the quantization and the rearrangement. Both the quantization and the rearrangement may further convert the data to the more compact representation form, and then data form conversion is performed on the probe data by combining the domain conversion, the quantization, and/or the rearrangement, so that the bit rate can be further reduced.

It should be understood that when the combination of the domain conversion, the quantization, and/or the rearrangement is used, an execution sequence of the domain conversion, the quantization, and the rearrangement is not limited in the present disclosure, a quantity of times that any one of the processing manners of the domain conversion, the quantization, and the rearrangement is performed is not limited either.

For example, the quantization may include uniform quantization or non-uniform quantization. The non-uniform quantization may include but is not limited to u-law quantization, a-law quantization, and the like. This is not limited in the present disclosure. In addition, the quantization may further include adaptive quantization and another type of quantization. This is not limited in the present disclosure either.

For example, the rearrangement may include first manner rearrangement and/or second manner rearrangement.

For example, when the probe data is the illumination data, and when the illumination data includes a plurality of channels, the first manner rearrangement includes at least one of the following: discarding data of some channels, converting the illumination data to preset precision, or performing dimension conversion on the illumination data.

It should be noted that the "illumination data" in "converting the illumination data to preset precision" may be original illumination data, illumination data obtained through domain conversion, illumination data obtained through quantization, illumination data obtained by discarding the data of the some channels, or illumination data obtained through dimension conversion.

It should be noted that the "illumination data" in "performing dimension conversion on the illumination data" may be original illumination data, illumination data obtained through domain conversion, illumination data obtained through quantization, illumination data obtained by discarding the data of the some channels, or illumination data converted to the preset precision.

For example, when the probe data is the visibility data, and when the visibility data includes a plurality of channels, the first manner rearrangement includes at least one of the following: performing channel splitting, converting the visibility data to preset precision, or performing dimension conversion on the visibility data.

It should be noted that the "visibility data" in "converting the visibility data to preset precision" may be original visibility data, visibility data obtained through domain conversion, visibility data obtained through quantization, visibility data obtained through channel splitting, or visibility data obtained through dimension conversion.

It should be noted that the "visibility data" in "performing dimension conversion on the visibility data" may be original visibility data, visibility data obtained through domain conversion, visibility data obtained through quantization, visibility data obtained through channel splitting, or visibility data converted to the preset precision.

For example, the second manner rearrangement may be used to pad data (which may refer to the probe data obtained through domain conversion, the quantized probe data, or the probe data obtained through first manner rearrangement) to a YUV plane.

The following describes a plurality of manners of combining the domain conversion, the quantization, and/or the rearrangement.

Figures 4A, 4B, 4C, 4D, 4E:
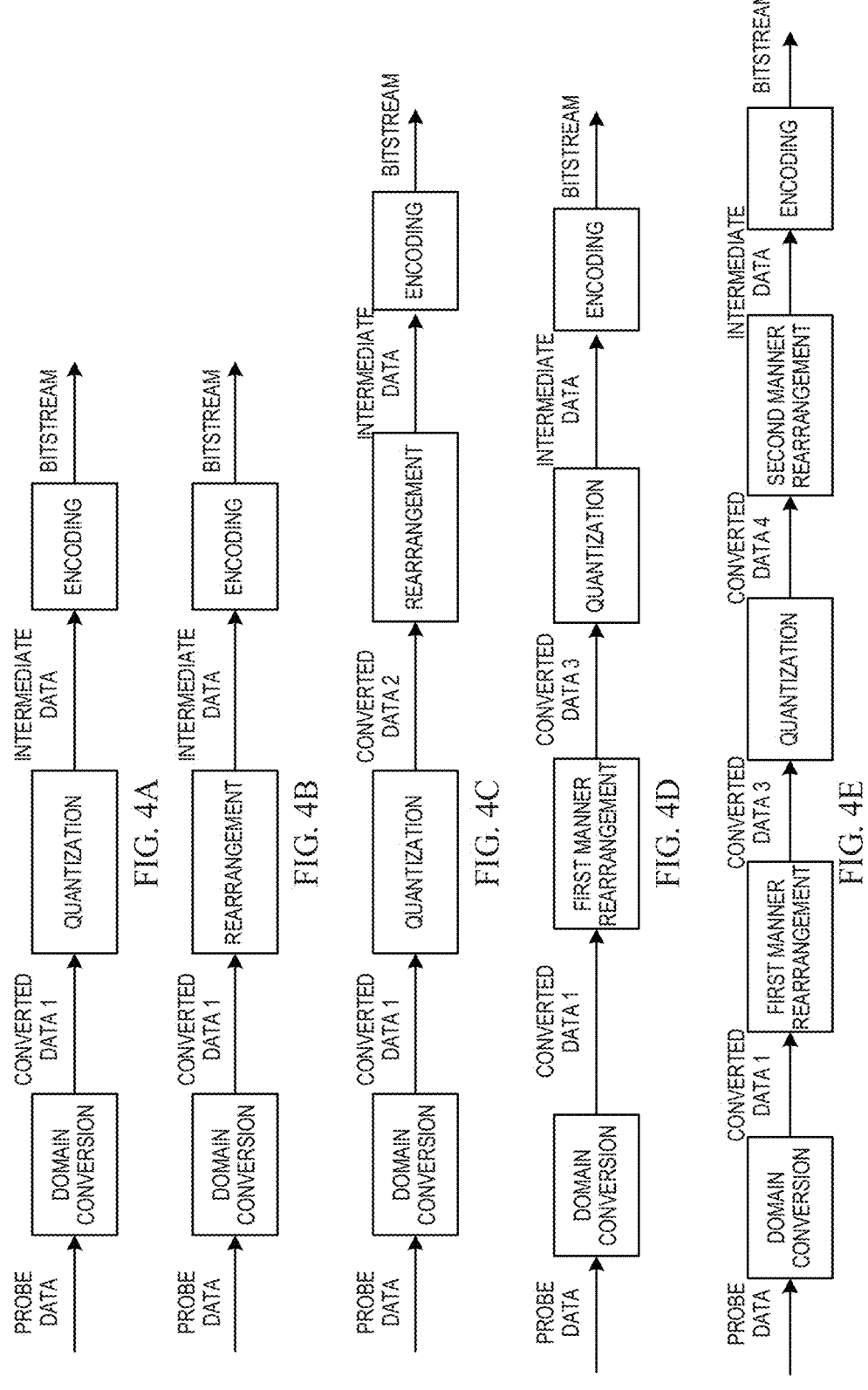
FIG. 4A-FIG. 4P are diagrams of examples of an encoding procedure.
Figures 4J, 4K, 4L, 4M:
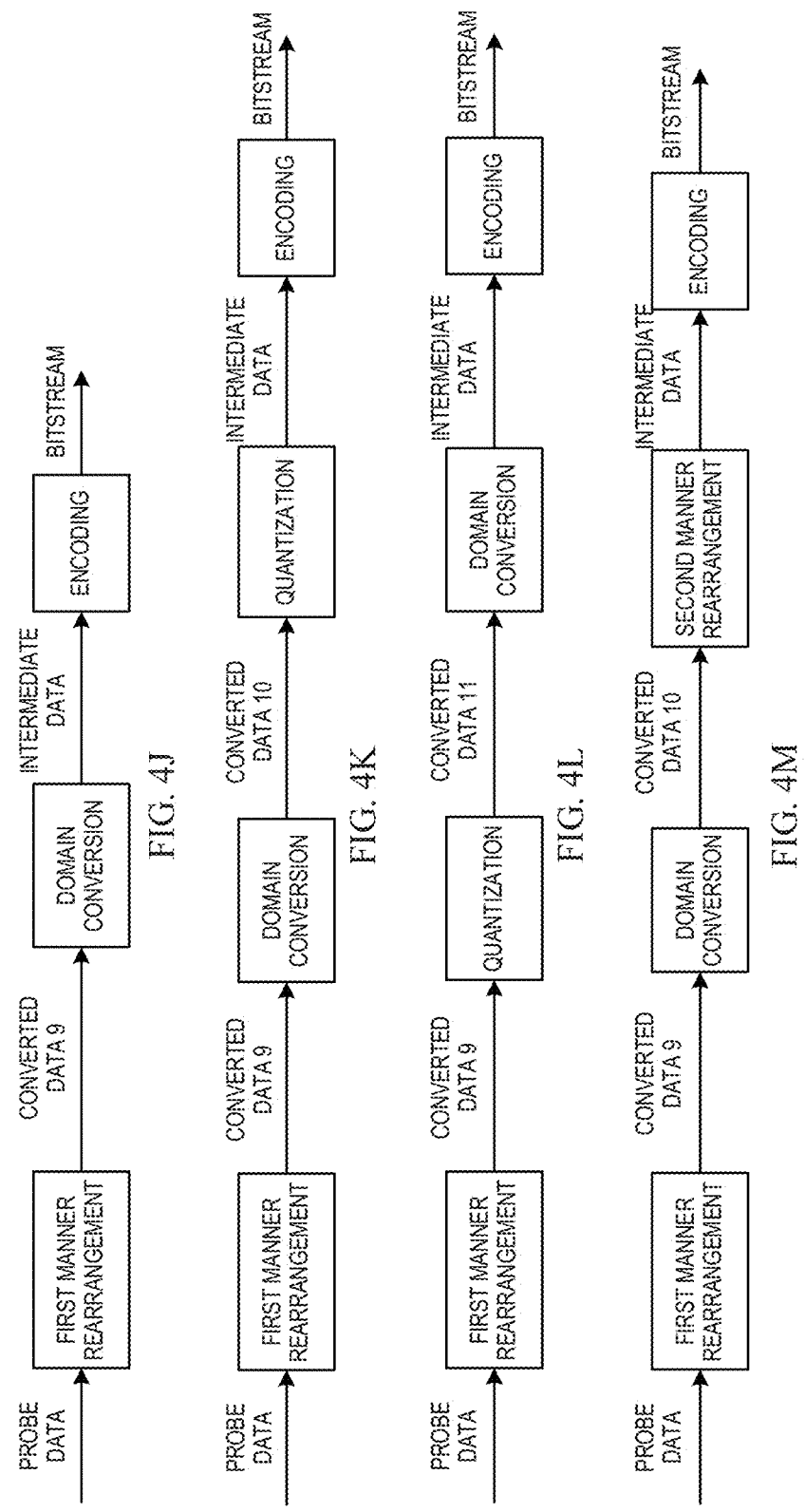
Figures 4N, 4O, 4P:
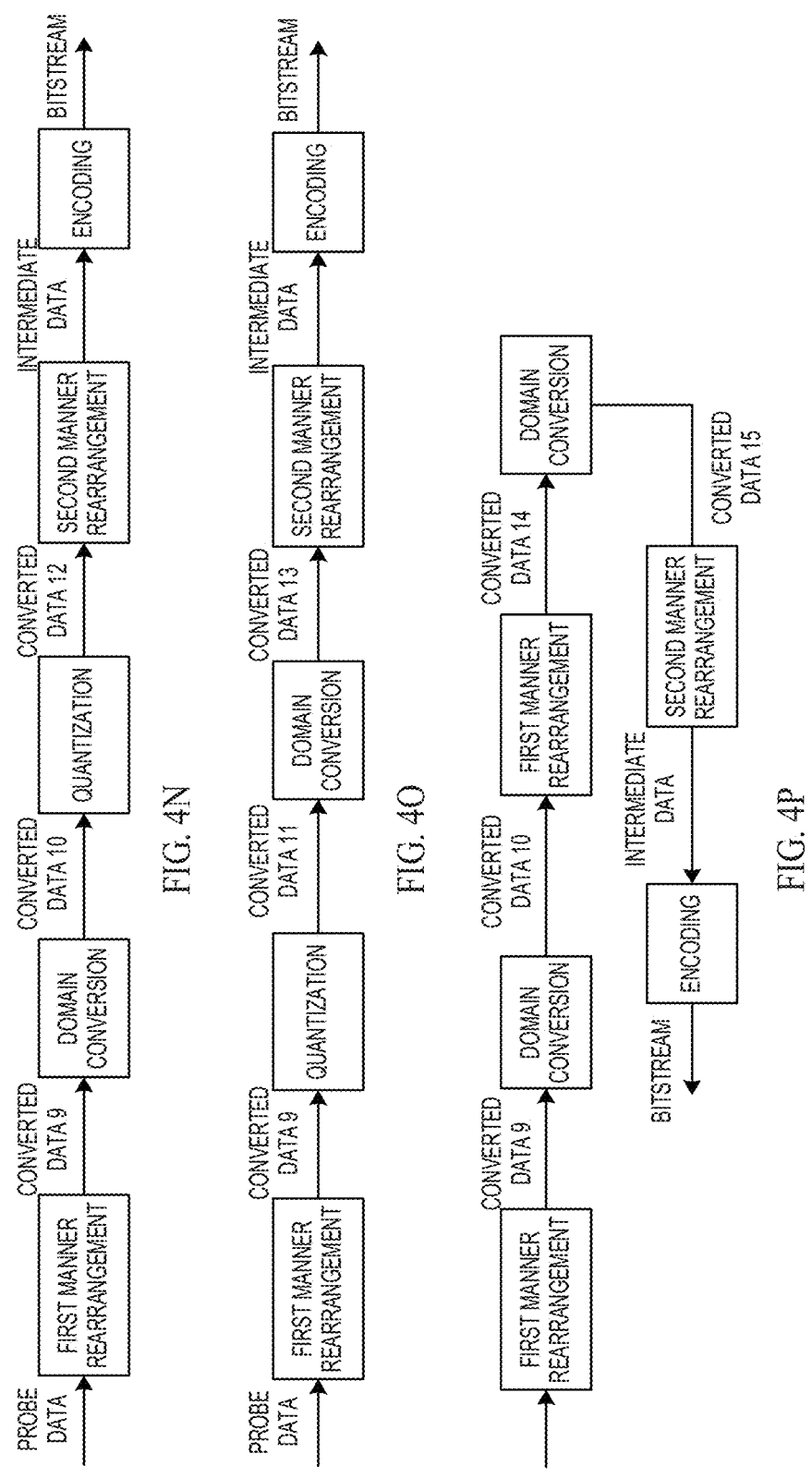

FIG. 4A-FIG. 4P are diagrams of examples of an encoding procedure.

In an embodiment in FIG. 4A, a manner of combining the domain conversion and the quantization is described. Refer to FIG. 4A. For example, after the probe data is obtained, domain conversion may be first performed on the probe data to obtain converted data 1, and then the converted data 1 is quantized to obtain intermediate data. Subsequently, the intermediate data is encoded to obtain a corresponding bitstream.

In an embodiment in FIG. 4B, a manner of combining the domain conversion and the rearrangement is described. Refer to FIG. 4B. For example, after the probe data is obtained, domain conversion may be first performed on the probe data to obtain converted data 1, and then the converted data 1 is rearranged to obtain intermediate data. Subsequently, the intermediate data is encoded to obtain a corresponding bitstream. The rearrangement in FIG. 4B may include the first manner rearrangement and/or the second manner rearrangement.

In an embodiment in FIG. 4C, a manner of combining the domain conversion, the quantization, and the rearrangement is described. Refer to FIG. 4C. For example, after the probe data is obtained, domain conversion may be first performed on the probe data to obtain converted data 1, the converted data 1 is quantized to obtain converted data 2, and then the converted data 2 is rearranged to obtain intermediate data. Subsequently, the intermediate data is encoded to obtain a corresponding bitstream.

In an embodiment in FIG. 4D, a manner of combining the domain conversion, the quantization, and the first manner rearrangement is described. Refer to FIG. 4D. For example, after the probe data is obtained, domain conversion may be first performed on the probe data to obtain converted data 1, the first manner rearrangement is performed on the converted data 1 to obtain converted data 3, and then the converted data 3 is quantized to obtain intermediate data. Subsequently, the intermediate data is encoded to obtain a corresponding bitstream.

In an embodiment in FIG. 4E, another manner of combining the domain conversion, the quantization, and the rearrangement is described. Refer to FIG. 4E. For example, after the probe data is obtained, domain conversion may be first performed on the probe data to obtain converted data 1, the first manner rearrangement is performed on the converted data 1 to obtain converted data 3, the converted data 3 is quantized to obtain converted data 4, and then the second manner rearrangement is performed on the converted data 4 to obtain intermediate data. Subsequently, the intermediate data is encoded to obtain a corresponding bitstream.

In an embodiment in FIG. 4F, a manner of combining the domain conversion and the quantization is described. Refer to FIG. 4F. For example, after the probe data is obtained, the probe data may be first quantized to obtain converted data 5, and then domain conversion is performed on the converted data 5 to obtain intermediate data. Subsequently, the intermediate data is encoded to obtain a corresponding bitstream.

In an embodiment in FIG. 4G, a manner of combining the domain conversion, the quantization, and the rearrangement is described. Refer to FIG. 4G. For example, after the probe data is obtained, the probe data may be first quantized to obtain converted data 5, domain conversion is performed on the converted data 5 to obtain converted data 6, and then the converted data 6 is rearranged to obtain intermediate data.

Subsequently, the intermediate data is encoded to obtain a corresponding bitstream. The rearrangement in FIG. 4B may include the first manner rearrangement and/or the second manner rearrangement.

In an embodiment in FIG. 4H, a manner of combining the domain conversion, the quantization, and the rearrangement is described. Refer to FIG. 4H. For example, after the probe data is obtained, the probe data may be first quantized to obtain converted data 5, the first manner rearrangement is performed on the converted data 5 to obtain converted data 7, and then domain conversion is performed on the converted data 7 to obtain intermediate data. Subsequently, the intermediate data is encoded to obtain a corresponding bitstream.

In an embodiment in FIG. 4I, a manner of combining the domain conversion, the quantization, and the rearrangement is described. Refer to FIG. 4I. For example, after the probe data is obtained, the probe data may be first quantized to obtain converted data 5, the first manner rearrangement is performed on the converted data 5 to obtain converted data 7, domain conversion is performed on the converted data 7 to obtain converted data 8, and then the second manner rearrangement is performed on the converted data 8 to obtain intermediate data. Subsequently, the intermediate data is encoded to obtain a corresponding bitstream.

In an embodiment in FIG. 4J, a manner of combining the domain conversion and the rearrangement is described. Refer to FIG. 4J. For example, after the probe data is obtained, the first manner rearrangement may be first performed on the probe data to obtain converted data 9, and then domain conversion is performed on the converted data 9 to obtain intermediate data. Subsequently, the intermediate data is encoded to obtain a corresponding bitstream.

In an embodiment in FIG. 4K, a manner of combining the domain conversion, the rearrangement, and the quantization is described. Refer to FIG. 4K. For example, after the probe data is obtained, the first manner rearrangement may be first performed on the probe data to obtain converted data 9, domain conversion is performed on the converted data 9 to obtain converted data 10, and then the converted data 10 is quantized to obtain intermediate data. Subsequently, the intermediate data is encoded to obtain a corresponding bitstream.

In an embodiment in FIG. 4L, a manner of combining the domain conversion, the rearrangement, and the quantization is described. Refer to FIG. 4L. For example, after the probe data is obtained, the first manner rearrangement may be first performed on the probe data to obtain converted data 9, the converted data 9 is quantized to obtain converted data 11, and then domain conversion is performed on the converted data 11 to obtain intermediate data. Subsequently, the intermediate data is encoded to obtain a corresponding bitstream.

In an embodiment in FIG. 4M, a manner of combining the domain conversion and the rearrangement is described. Refer to FIG. 4M. For example, after the probe data is obtained, the first manner rearrangement may be first performed on the probe data to obtain converted data 9, domain conversion is performed on the converted data 9 to obtain converted data 10, and then the second manner rearrangement is performed on the converted data 10 to obtain intermediate data. Subsequently, the intermediate data is encoded to obtain a corresponding bitstream.

In an embodiment in FIG. 4N, a manner of combining the domain conversion, the rearrangement, and the quantization is described. Refer to FIG. 4N. For example, after the probe data is obtained, the first manner rearrangement may be first performed on the probe data to obtain converted data 9, domain conversion is performed on the converted data 9 to obtain converted data 10, the converted data 10 is quantized to obtain converted data 12, and then the second manner rearrangement is performed on the converted data 12 to obtain intermediate data. Subsequently, the intermediate data is encoded to obtain a corresponding bitstream.

In an embodiment in FIG. 4O, a manner of combining the domain conversion, the rearrangement, and the quantization is described. Refer to FIG. 4O. For example, after the probe data is obtained, the first manner rearrangement may be first performed on the probe data to obtain converted data 9, the converted data 9 is quantized to obtain converted data 11, domain conversion is performed on the converted data 11 to obtain converted data 13, and then the second manner rearrangement is performed on the converted data 13 to obtain intermediate data. Subsequently, the intermediate data is encoded to obtain a corresponding bitstream.

In an embodiment in FIG. 4P, a manner of combining the domain conversion, the rearrangement, and the quantization is described. Refer to FIG. 4P. For example, after the probe data is obtained, the first manner rearrangement may be first performed on the probe data to obtain converted data 9, domain conversion is performed on the converted data 9 to obtain converted data 10, the first manner rearrangement is performed on the converted data 10 to obtain converted data 14, domain conversion is performed on the converted data 14 to obtain converted data 15, and then the second manner rearrangement is performed on the converted data 15 to obtain intermediate data. Subsequently, the intermediate data is encoded to obtain a corresponding bitstream.

It should be noted that, in FIG. 4P, the first manner rearrangement in performing the first manner rearrangement on the probe data to obtain the converted data 9 may include at least one of the following: discarding the data of the some channels, performing channel splitting, and converting the data to the preset precision. The first manner rearrangement in performing the first manner rearrangement on the converted data 10 to obtain the converted data 14 may be the dimension conversion. The domain conversion in performing domain conversion on the converted data 9 to obtain the converted data 10 may be conversion from the picture domain to a spherical harmonic function domain. The domain conversion in performing domain conversion on the converted data 14 to obtain the converted data 15 may be conversion from the spherical harmonic function domain to an eigenvector domain.

It should be noted that the domain conversion in FIG. 4A to FIG. 4P may include at least one of the following: the normalization, the conversion from the linear domain to the non-linear domain, the conversion from the RGB domain to the YUV domain, the conversion from the RGB domain to the XYZ domain, the conversion from the RGB domain to the Lab domain, and the conversion from the picture domain to the transform domain. In addition, a quantity of times of performing various types of domain conversion in FIG. 4A to FIG. 4P, and a sequence of performing different types of domain conversion are not limited in the present disclosure.

It should be noted that the quantization in FIG. 4A to FIG. 4P may be the uniform quantization and/or the non-uniform quantization. In addition, a quantity of times of performing various types of quantization in FIG. 4A to FIG. 4P, and a sequence of performing different types of quantization are not limited in the present disclosure.

It should be noted that the first manner rearrangement in FIG. 4A to FIG. 4P may include at least one of the following: discarding the channels, performing channel splitting, converting the data to the preset precision, and performing dimension conversion. In addition, a quantity of times of performing various types of first manner rearrangement in FIG. 4A to FIG. 4P, and a sequence of performing different types of first manner rearrangement are not limited in the present disclosure.

The following describes in detail a process of encoding the illumination data by using an encoding procedure shown in FIG. 4N as an example.

Figure 5:
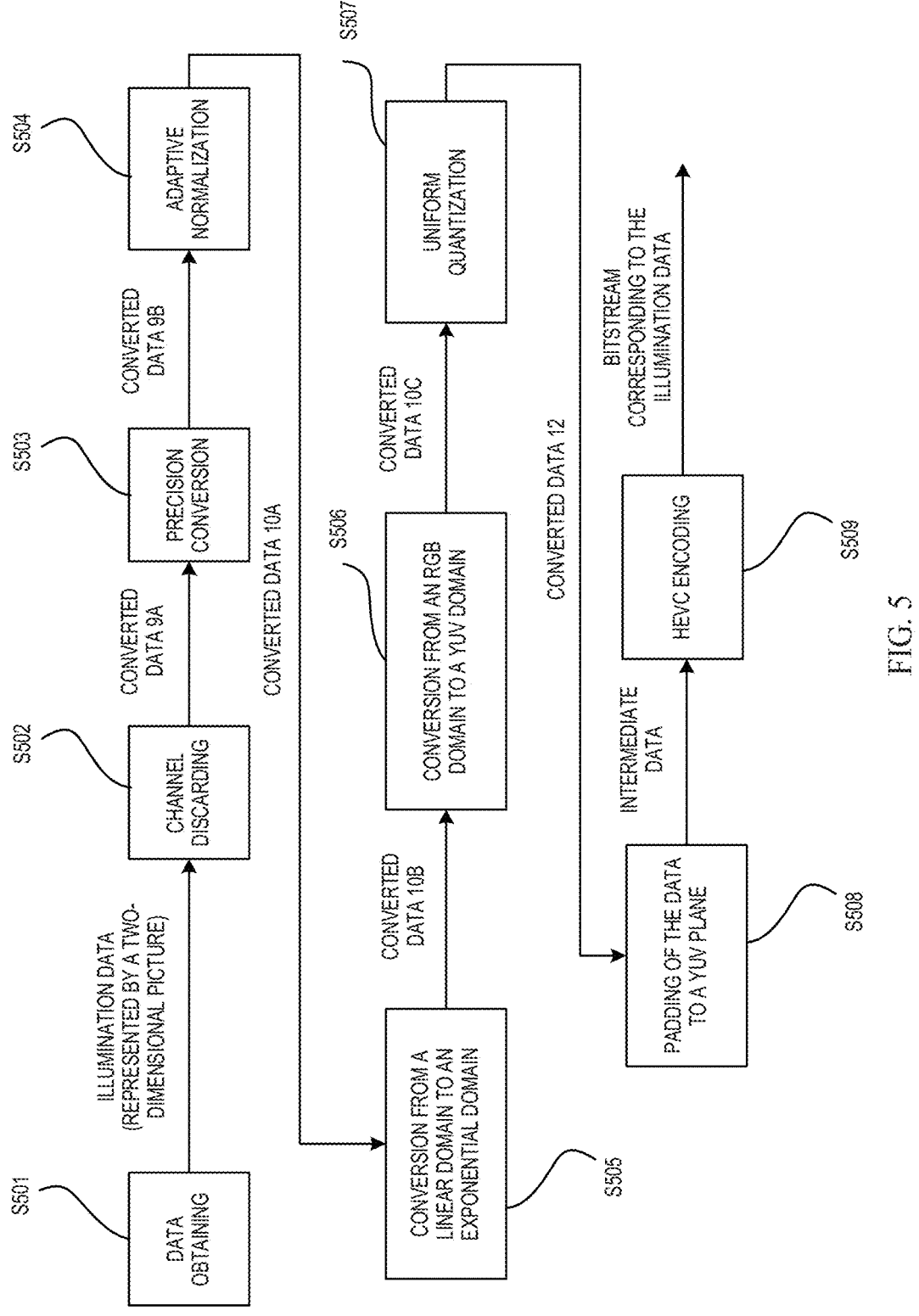
FIG. 5 is a diagram of an example of an encoding procedure.

FIG. 5 is a schematic diagram of an example of an encoding procedure. The encoding procedure may include: S501: Obtain data; S502: Discard a channel; S503: Perform precision conversion; S504: Perform adaptive normalization; S505: Perform conversion from a linear domain to an exponential domain; S506: Perform conversion from an RGB domain to a YUV domain; S507: Perform uniform quantization; S508: Pad data to a YUV plane; and S509: Perform HEVC encoding. In an embodiment in FIG. 5, illumination data is represented by a two-dimensional picture. The converted data 9 includes converted data 9A and converted data 9B. The converted data 10 includes converted data 10A, converted data 10B, and converted data 10C.

S501: Obtain the data, that is, obtain the illumination data, where the illumination data is represented by the two-dimensional picture.

For example, illumination data of K probes may be a two-dimensional picture in which a single pixel includes three channels of R, G, and B, or may be a two-dimensional picture in which a single pixel includes four channels of R, G, B, and A. Each probe may correspond to a plurality of pixels in the two-dimensional picture.

For example, an RGB format of each pixel is not limited in the present disclosure, for example, may be R11G11B10F (the R channel and the G channel are represented by 11-bit floating point numbers, and the B channel is represented by a 10-bit floating point number), may be RGB9E5 (the R channel, the B channel, and the G channel are all represented by a 9-bit integer, and share an exponent bit represented by a 5-bit integer), or the like.

For example, an RGBA format of each pixel is not limited in the present disclosure, for example, may be RGB10A2 (the R channel, the B channel, and the G channel are all represented by a 10-bit integer, and the A channel is represented by a 2-bit integer), may be RGBA16F (the R channel, the B channel, the G channel, and the A channel are all represented by a 16-bit floating point number), or the like.

S502: Discard the channel. If the illumination data obtained in S501 includes the four channels of R, G, B, and A, the A channel in the illumination data is discarded to obtain the converted data 9A.

For example, if the illumination data includes the four channels of R, G, B, and A, the A channel in the illumination data is discarded to obtain the converted data 9A. The converted data 9A is also a two-dimensional picture in which a single pixel includes the three channels of R, G, and B.

For example, if the illumination data includes the three channels of R, G, and B, S502 may not be performed, and after S501 is performed, S503 is directly performed.

S503: Perform precision conversion, that is, convert the converted data 9A obtained in S502 to preset precision to obtain the converted data 9B.

For example, the preset precision may be set to be greater than or equal to a precision threshold based on a requirement, to ensure precision of the illumination data sent to a second device, thereby ensuring rendering effect. The precision threshold may be set based on the requirement. For example, if the precision threshold is the 16-bit floating point number, the preset precision may be set to the 16-bit floating point number or a 32-bit floating point number. This is not limited in the present disclosure.

For example, data of each channel (the R channel, the G channel, and the B channel) of each pixel in the converted data 9A may all be converted to the preset precision to obtain the converted data 9B. The converted data 9B is also a two-dimensional picture in which a single pixel includes the three channels of R, G, and B, and data of each channel is of the preset precision.

In addition, because precision of illumination data generated in different application scenarios may be different, the illumination data in different application scenarios can be converted to same precision by performing S503, thereby facilitating subsequent data form conversion.

S504: Perform adaptive normalization, that is, perform adaptive normalization on the converted data 9B obtained in S503 to obtain the converted data 10A.

In a possible manner, a maximum value of data of R channels of all pixels in the converted data 9B may be determined, and the maximum value of the data of the R channel is used as a normalization parameter. Then, the data of the R channel of each pixel in the converted data 9B is divided by the normalization parameter to normalize the data of the R channel of each pixel in the converted data 9B, to normalize the data of the R channel of each pixel in the converted data 9B to be within [0, 1]. Correspondingly, data of G channels and data of B channels of all the pixels in the converted data 9B may be separately normalized in the manner of normalizing the data of R channels of all the pixels in the converted data 9B, to normalize the data of the G channel and the data of the B channel of each pixel in the converted data 9B to be within [0, 1]. In this way, the converted data 10A may be obtained. The converted data 10A is also a two-dimensional picture in which a single pixel includes the three channels of R, G, and B, data of each channel is of the preset precision, and data of each channel belongs to [0, 1].

In a possible manner, a maximum value of data of the three channels of R, G, and B of all the pixels in the converted data 9B may be determined, and the maximum value of the data of the three channels of R, G, and B is used as the normalization parameter. For a pixel in the converted data 9B, the data of the R channel of the pixel may be divided by the normalization parameter, the data of the G channel of the pixel may be divided by the normalization parameter, and the data of the B channel of the pixel may be divided by the normalization parameter, to normalize the data of the three channels of R, G, and B of the pixel in the converted data 9B. In this way, data of the three channels of R, G, and B of each pixel in the converted data 9B can be all normalized to be within [0, 1]. In this way, the converted data 10A may also be obtained.

It should be understood that the adaptive normalization in S504 may be replaced with any one of various types of normalization like fixed parameter normalization, min-max normalization, and z-score normalization. This is not limited in the present disclosure.

Fixed parameter normalization: A preset fixed parameter may be preset, and the preset fixed parameter is used as the normalization parameter. For a pixel in the converted data 9B, the data of the R channel of the pixel may be divided by the normalization parameter, the data of the G channel of the pixel may be divided by the normalization parameter, and the data of the B channel of the pixel may be divided by the normalization parameter, to normalize the data of the three channels of R, G, and B of the pixel in the converted data 9B. In this way, the data of the three channels of R, G, and B of each pixel in the converted data 9B can be all normalized to be within [0, 1]. Further, the converted data 10A may also be obtained.

Min-max normalization: In a possible manner, a maximum value and a minimum value of the data of the R channels of all the pixels in the converted data 9B may be determined, and a difference between the maximum value and the minimum value of the data of the R channels is calculated to obtain a difference Q1. For a pixel in the converted data 9B, a difference between the data of the R channel of the pixel and the minimum value is calculated to obtain a difference F1, and the difference F1 is divided by the difference Q1 to normalize the data of the R channel of the pixel in the converted data 9B. In this way, the data of the R channel of each pixel in the converted data 9B can be normalized to be within [0, 1]. Correspondingly, the data of the G channels and the data of the B channels of all the pixels in the converted data 9B may be separately normalized in the manner of normalizing the data of R channels of all the pixels in the converted data 9B, to normalize the data of the G channel and the data of the B channel of each pixel in the converted data 9B to be within [0, 1]. In this way, the converted data 10A may be obtained.

In a possible manner, a maximum value and a minimum value of the data of the three channels of R, G, and B of all the pixels in the converted data 9B may be determined, and a difference between the maximum value and the minimum value of the data of the three channels of R, G, and B is calculated to obtain a difference Q2. For a pixel in the converted data 9B, a difference between the data of the R channel of the pixel and the minimum value is calculated to obtain a difference F2, and the difference F2 is divided by the difference Q2 to normalize the data of the R channel of the pixel in the converted data 9B. A difference between the data of the G channel of the pixel and the minimum value is calculated to obtain a difference F3, and the difference F3 is divided by the difference Q2 to normalize the data of the G channel of the pixel in the two-dimensional picture. A difference between the data of the B channel of the pixel and the minimum value is calculated to obtain a difference F4, and the difference F4 is divided by the difference Q2 to normalize the data of the B channel of the pixel in the converted data 9B. In this way, the data of the three channels of R, G, and B of each pixel in the converted data 9B can be all normalized to be within [0, 1]. Further, the converted data 10A may also be obtained.

Z-score normalization: For a pixel in the converted data 9B, an average value and a standard deviation of the data of the R channels of all the pixels in the converted data 9B may be calculated, and then the data of the R channel of the pixel is normalized based on the average value and the standard deviation. For example, z-score normalization may be performed with reference to the following formula:

$$X^* = \frac{X - E(X)}{\sqrt{D(X)}}$$

X is the data of the R channel of the pixel in the converted data 9B, X* is the data that is of the R channel of the pixel and that is obtained through z-score normalization, E(X) is the average value of the data of the R channels of all the pixels in the converted data 9B, and $\sqrt{D(X)}$ is the standard deviation of the data of the R channels of all the pixels in the converted data 9B.

Based on the foregoing manner, z-score normalization may be performed on the data of the G channel and the data of the B channel of the pixel. Further, in the foregoing manner, z-score normalization may be performed on the data of each of the three channels of R, G, and B of all the pixels in the converted data 9B.

S505: Perform conversion from the linear domain to the exponential domain, that is, convert the converted data 10A obtained in S504 from the linear domain to the exponential domain to obtain the converted data 10B.

For example, an exponential conversion parameter (which may be an exponential value like 2.2 or 5.0) may be preset, and then a value corresponding to an exponent of the converted data 10A may be calculated when the exponent of the converted data 10A is the exponential conversion parameter, to convert the converted data 10A from the linear domain to the exponential domain. In this way, the converted data 10B is obtained. The converted data 10B is also a two-dimensional picture in which a single pixel includes the three channels of R, G, and B, data of each channel is of the preset precision, and data of each channel is data in the exponential domain.

It should be understood that the conversion from the linear domain to the exponential domain in S505 may be replaced with a PQ domain or an HLG domain. This is not limited in the present disclosure.

For example, if S505 is converting the converted data 10A from the linear domain to the PQ domain to obtain the converted data 10B, the converted data 10A may be mapped to the PQ domain by using a PQ curve, to obtain the converted data 10B. In this case, the converted data 10B is also a two-dimensional picture in which a single pixel includes the three channels of R, G, and B, data of each channel is of the preset precision, and data of each channel is data in the PQ domain. For example, data of each of the three channels of R, G, and B of each pixel in the two-dimensional picture may be mapped by using the PQ curve, to obtain the converted data 10B.

For example, if S505 is converting the converted data 10A from the linear domain to the HLG domain to obtain the converted data 10B, the converted data 10A may be mapped to the HLG domain by using an HLG curve, to obtain the converted data 10B. The converted data 10B is also a two-dimensional picture in which a single pixel includes the three channels of R, G, and B, data of each channel is of the preset precision, and data of each channel is data in the HLG domain. For example, data of each of the three channels of R, G, and B of each pixel in the two-dimensional picture may be mapped by using the HLG curve, to obtain the converted data 10B.

S506: Perform conversion from the RGB domain to the YUV domain, that is, convert the converted data 10B obtained in S505 from the RGB domain to the YUV domain to obtain the converted data 10C.

In a possible manner, the data of the three channels of R, G, and B of each pixel may be converted to data of three channels of Y, U, and V in a manner of conversion from an RGB color space to a YUV 444 color space, to obtain the converted data 10C. The converted data 10C is a two-dimensional picture in which a single pixel includes the three channels of Y, U, and V, data of each channel is of the preset precision, and data of each channel is data in the exponential domain. Each pixel corresponds to a Y channel, a U channel, and a V channel.

In a possible manner, the data of the three channels of R, G, and B of each pixel may be converted to data of three channels of Y, U, and V in a manner of conversion from an RGB color space to a YUV 420 color space, to obtain the converted data 10C. The converted data 10C is a two-dimensional picture in which a single pixel includes the three channels of Y, U, and V, data of each channel is of the preset precision, and data of each channel is data in the exponential domain. Each pixel corresponds to a Y channel, and four pixels share a U channel and a V channel.

It should be understood that the conversion from the RGB domain to the YUV domain in S506 may be conversion from an RGB domain to an XYZ domain or conversion from an RGB domain to a Lab domain. This is not limited in the present disclosure.

S507: Perform uniform quantization, that is, perform uniform quantization on the converted data 10C obtained in S506 to obtain converted data 12.

For example, target quantization precision may be preset, for example, an 8-bit unsigned integer, a 12-bit unsigned integer, or a 16-bit unsigned integer. This is not limited in the present disclosure.

For example, uniform quantization may be performed on the converted data 10C based on the target quantization precision to obtain the converted data 12. The converted data 12 is a two-dimensional picture in which a single pixel includes the three channels of Y, U, and V, data of each channel is of the target quantization precision, and data of each channel is data in the exponential domain.

For example, it is assumed that the target quantization precision is the 12-bit unsigned integer, and a value range of the converted data 10C is [L1, L2]. [L1, L2] may be divided into 4096 values with equal intervals for one of the three channels of Y, U, and V of a pixel. If data of the channel of the pixel belongs to [z1, z2] (z1 is greater than or equal to L1, and z2 is less than or equal to L2), the data of the channel of the pixel may be quantized as z2. In this way, the converted data 12 is a two-dimensional picture in which a single pixel includes the three channels of Y, U, and V, data of each channel is of the 12-bit unsigned integer, and data of each channel is data in the exponential domain.

It should be understood that uniform quantization in S507 may alternatively be replaced with non-uniform quantization or adaptive quantization. This is not limited in the present disclosure.

S508: Pad the data to the YUV plane, that is, pad the converted data 12 obtained in S507 to the YUV plane to obtain intermediate data.

For example, if conversion from the RGB domain to the YUV domain is performed on the converted data 10B in the manner of the conversion from the RGB color space to the YUV 420 color space, the converted data 12 may be padded to the YUV 420 plane. For example, data of the Y channel of each pixel may be padded to a Y plane in the YUV 420 plane, data of the U channel of each pixel may be padded to a U plane in the YUV 420 plane, and data of the V channel of each pixel may be padded to a V plane in the YUV 420 plane, where Y plane:U plane:V plane=4:1:1.

For example, if conversion from the RGB domain to the YUV domain is performed on the converted data 10B in the manner of the conversion from the RGB color space to the YUV 444 color space, the converted data 12 may be padded to the YUV 444 plane. For example, data of the Y channel of each pixel may be padded to a Y plane in the YUV 444 plane, data of the U channel of each pixel may be padded to a U plane in the YUV 444 plane, and data of the V channel of each pixel may be padded to a V plane in the YUV 444 plane, where Y plane:U plane:V plane=1:1:1.

For example, when data precision of the YUV plane (which may be the YUV 420 plane or the YUV 444 plane) is higher than data precision of the converted data 12, a most significant bit or a least significant bit of the converted data 12 may be padded to convert the precision of the converted data 12 to the same precision as the YUV plane. Then, the padded converted data 12 is padded to the YUV plane. For example, if the data precision of the YUV plane is 16 bits, and the data precision of the converted data 12 is 12 bits, four most significant bits or four least significant bits of data of each channel of each pixel may be padded with Os, and then the padded converted data 12 is padded to the 16-bit YUV plane.

S509: Perform HEVC encoding, that is, perform HEVC encoding on the intermediate data obtained in S508 to obtain a bitstream corresponding to the illumination data.

It should be noted that a sequence of the six steps S502 to S507 may be randomly changed. This is not limited in the present disclosure.

Figure 6:
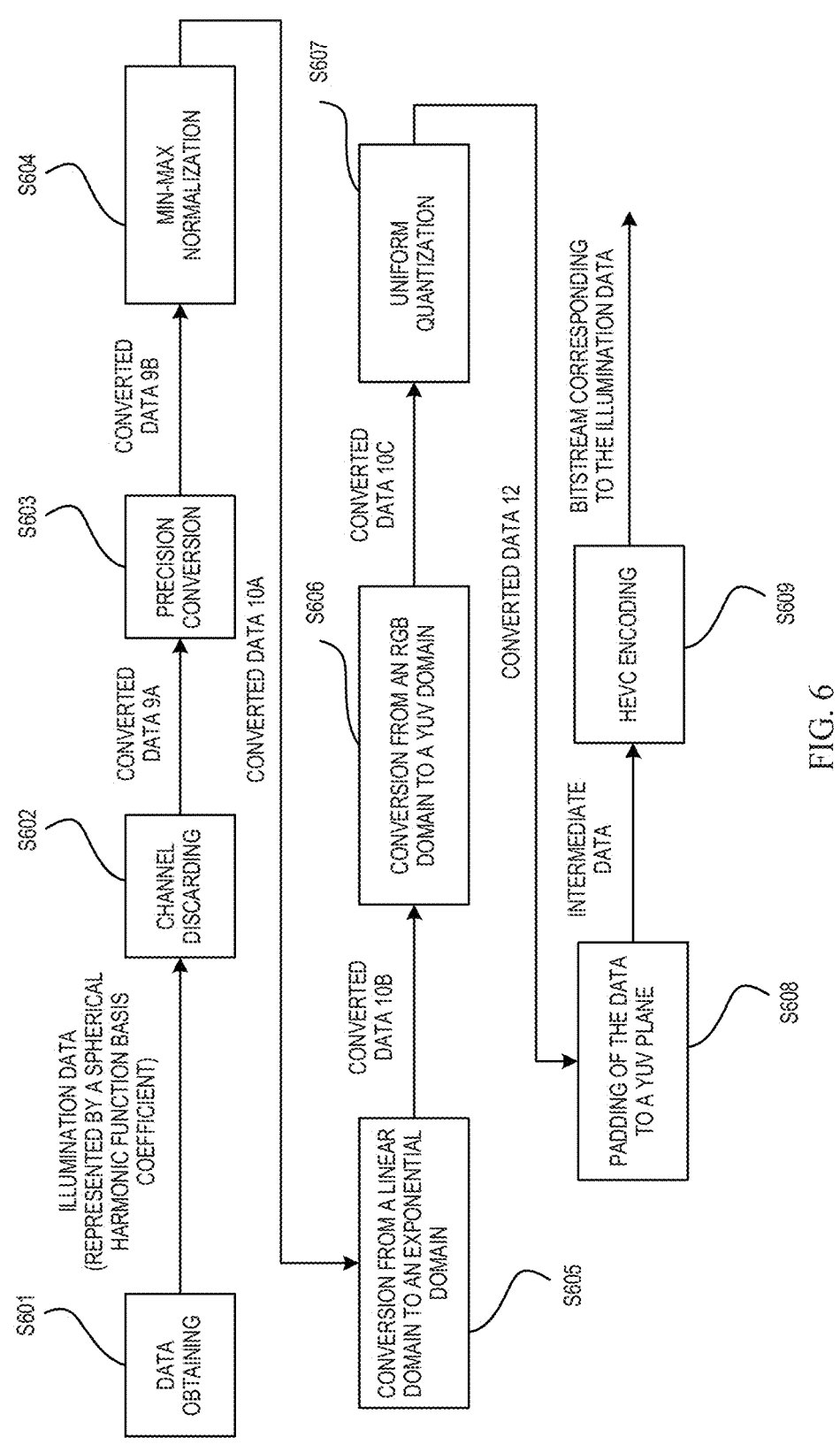
FIG. 6 is a diagram of an example of an encoding procedure.

FIG. 6 is a schematic diagram of an example of an encoding procedure. The encoding procedure may include: S601: Obtain data; S602: Discard a channel; S603: Perform precision conversion; S604: Perform min-max normalization; S605: Perform conversion from a linear domain to an exponential domain; S606: Perform conversion from an RGB domain to a YUV domain; S607: Perform uniform quantization; S608: Pad data to a YUV plane; and S609: Perform HEVC encoding. In an embodiment in FIG. 6, illumination data is represented by a spherical harmonic function basis coefficient. The converted data 9 includes converted data 9A and converted data 9B. The converted data 10 includes converted data 10A, converted data 10B, and converted data 10C.

S601: Obtain the data, that is, obtain the illumination data, where the illumination data is represented by the spherical harmonic function basis coefficient.

For example, illumination data of each probe may include three channels of R, G, and B or four channels of R, G, B, and A, where the data of each channel includes x spherical harmonic function basis coefficients.

It should be understood that, in the embodiment in FIG. 6, a format of the illumination data is also not limited in the present disclosure. For example, the illumination data may be R11G11B10F, RGB9E5, or RGBA16F. This is not limited in the present disclosure.

It should be understood that the illumination data may alternatively be represented by a spherical wavelet basis coefficient. This is not limited in the present disclosure.

S602: Discard the channel. If the illumination data obtained in S601 includes the four channels of R, G, B, and A, the A channel in the illumination data is discarded to obtain the converted data 9A.

For example, the converted data 9A of each probe may alternatively include the three channels of R, G, and B, where data of each channel includes the x spherical harmonic function basis coefficients. For example, for S602, refer to the foregoing descriptions of S502.

S603: Perform precision conversion, that is, convert the converted data 9A obtained in S602 to preset precision to obtain the converted data 9B.

For example, the converted data 9B of each probe may alternatively include the three channels of R, G, and B, where data of each channel includes the x spherical harmonic function basis coefficients. Precision of each spherical harmonic function basis coefficient is the preset precision.

For example, for S603, refer to the foregoing descriptions of S503.

S604: Perform min-max normalization, that is, perform min-max normalization on the converted data 9B obtained in S603 to obtain the converted data 10A.

In a possible manner, min-max normalization may be performed on spherical harmonic function basis coefficients corresponding to same spherical harmonic function bases of same channels of all probes. For example, a maximum value and a minimum value of spherical harmonic function basis coefficients corresponding to ith (i ranges from 1 to x, and i is an integer) spherical harmonic function bases in R channels of all the probes may be determined, and a difference between the maximum value and the minimum value is calculated to obtain a difference Q3. For a spherical harmonic function basis coefficient corresponding to an ith spherical harmonic function basis of an R channel of each probe, a difference between the spherical harmonic function basis coefficient corresponding to the ith spherical harmonic function basis of the R channel of the probe and the minimum value is calculated to obtain a difference F5. The difference F5 is divided by the difference Q3 to normalize the spherical harmonic function basis coefficient corresponding to the ith spherical harmonic function basis of the R channel of the probe. In this way, the spherical harmonic function basis coefficients corresponding to the ith spherical harmonic function bases of the R channels of all the probes can be normalized to be within [0, 1]. In this way, spherical harmonic function basis coefficients corresponding to the x spherical harmonic function bases of the R channels of all the probes can be normalized to be within [0, 1]. Correspondingly, in the manner of normalizing the spherical harmonic function basis coefficients corresponding to the x spherical harmonic function bases of the R channels of all the probes, spherical harmonic function basis coefficients corresponding to x spherical harmonic function bases of G channels and B channels of all the probes may be normalized to normalize the spherical harmonic function basis coefficients corresponding to the x spherical harmonic function bases of the G channels and the B channels of all the probes to be within [0, 1]. In this way, the converted data 10A may be obtained. The converted data 10A of each probe may alternatively include the three channels of R, G, and B, where data of each channel includes the x spherical harmonic function basis coefficients. Precision of each spherical harmonic function basis coefficient is the preset precision, and each spherical harmonic function basis coefficient belongs to [0, 1].

In a possible manner, min-max normalization may be performed on spherical harmonic function basis coefficients corresponding to same spherical harmonic function bases of the three channels of R, G, and B of all the probes. For example, a maximum value and a minimum value of spherical harmonic function basis coefficients corresponding to ith spherical harmonic function bases in the three channels of R, G, and B of all the probes may be determined, and a difference between the maximum value and the minimum value is calculated to obtain a difference Q4. For a spherical harmonic function basis coefficient corresponding to an ith spherical harmonic function basis of an R channel of each probe, a difference between the spherical harmonic function basis coefficient corresponding to the ith spherical harmonic function basis of the R channel of the probe and the minimum value is calculated to obtain a difference F6. The difference F6 is divided by the difference Q4 to normalize the spherical harmonic function basis coefficient corresponding to the ith spherical harmonic function basis of the R channel of the probe. For a spherical harmonic function basis coefficient corresponding to an ith spherical harmonic function basis of a G channel of each probe, a difference between the spherical harmonic function basis coefficient corresponding to the ith spherical harmonic function basis of the G channel of the probe and the minimum value is calculated to obtain a difference F7. The difference F7 is divided by the difference Q4 to normalize the spherical harmonic function basis coefficient corresponding to the ith spherical harmonic function basis of the G channel of the probe. For a spherical harmonic function basis coefficient corresponding to an ith spherical harmonic function basis of a B channel of each probe, a difference between the spherical harmonic function basis coefficient corresponding to the ith spherical harmonic function basis of the B channel of the probe and the minimum value is calculated to obtain a difference F8. The difference F8 is divided by the difference Q4 to normalize the spherical harmonic function basis coefficient corresponding to the ith spherical harmonic function basis of the B channel of the probe. In this way, the data of the three channels of R, G, and B of each probe can be all normalized to be within [0, 1] to obtain the converted data 10A.

S605: Perform conversion from the linear domain to the exponential domain, that is, convert the converted data 10A obtained in S604 from the linear domain to the exponential domain to obtain the converted data 10B.

The converted data 10B of each probe may alternatively include the three channels of R, G, and B, where data of each channel includes the x spherical harmonic function basis coefficients. Precision of each spherical harmonic function basis coefficient is the preset precision, and each spherical harmonic function basis coefficient belongs to the exponential domain.

For example, for S605, refer to the foregoing descriptions of S505.

S606: Perform conversion from the RGB domain to the YUV domain, that is, convert the converted data 10B obtained in S605 from the RGB domain to the YUV domain to obtain the converted data 10C.

The converted data 10C of each probe may alternatively include the three channels of Y, U, and V, where data of each channel includes the x spherical harmonic function basis coefficients. Precision of each spherical harmonic function basis coefficient is the preset precision, and each spherical harmonic function basis coefficient belongs to the exponential domain.

For example, for S606, refer to the foregoing descriptions of S506.

S607: Perform uniform quantization, that is, perform uniform quantization on the converted data 10C obtained in S606 to obtain converted data 12.

The converted data 12 of each probe may alternatively include the three channels of Y, U, and V, where data of each channel includes the x spherical harmonic function basis coefficients. Precision of each spherical harmonic function basis coefficient is target quantization precision, and each spherical harmonic function basis coefficient belongs to the exponential domain. For example, for S607, refer to the foregoing descriptions of S507.

S608: Pad the data to the YUV plane, that is, pad the converted data 12 obtained in S607 to the YUV plane to obtain intermediate data.

S609: Perform HEVC encoding, that is, perform HEVC encoding on the intermediate data obtained in S608 to obtain a bitstream corresponding to the illumination data.

For example, for S608 and S609, refer to the foregoing descriptions of S508 and S509.

It should be noted that a sequence of the six steps S602 to S607 may be randomly changed. This is not limited in the present disclosure.

Figure 7:
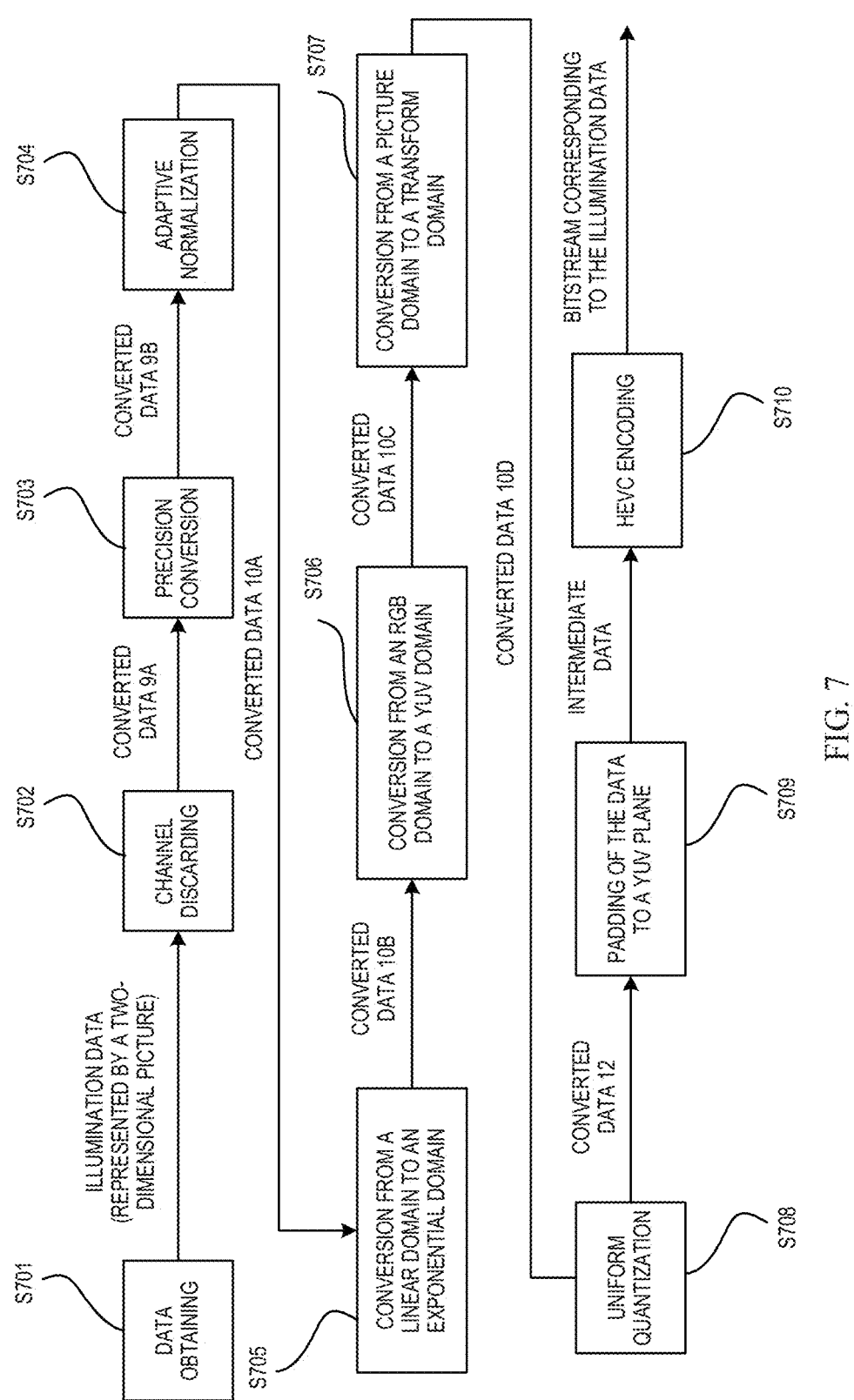
FIG. 7 is a diagram of an example of an encoding procedure.

FIG. 7 is a schematic diagram of an example of an encoding procedure. The encoding procedure may include: S701: Obtain data; S702: Discard a channel; S703: Perform precision conversion; S704: Perform adaptive normalization; S705: Perform conversion from a linear domain to an exponential domain; S706: Perform conversion from an RGB domain to a YUV domain; S707: Perform conversion from a picture domain to a transform domain; S708: Perform uniform quantization; S709: Pad data to a YUV plane; and S710: Perform HEVC encoding. In an embodiment in FIG. 7, illumination data is represented by a two-dimensional picture. The converted data 9 includes converted data 9A and converted data 9B. The converted data 10 includes converted data 10A, converted data 10B, converted data 10C, and converted data 10$d$.

S701: Obtain the data, that is, obtain the illumination data, where the illumination data is represented by the two-dimensional picture.

S702: Discard the channel. If the illumination data obtained in S701 includes the four channels of R, G, B, and A, the A channel in the illumination data is discarded to obtain the converted data 9A.

S703: Perform precision conversion, that is, convert the converted data 9A obtained in S702 to preset precision to obtain the converted data 9B.

S704: Perform adaptive normalization, that is, perform adaptive normalization on the converted data 9B obtained in S703 to obtain the converted data 10A.

S705: Perform conversion from the linear domain to the exponential domain, that is, convert the converted data 10A obtained in S704 from the linear domain to the exponential domain to obtain the converted data 10B.

S706: Perform conversion from the RGB domain to the YUV domain, that is, convert the converted data 10B obtained in S705 from the RGB domain to the YUV domain to obtain the converted data 10C.

For example, for S701 to S706, refer to the foregoing descriptions of S501 to S506.

S707: Perform conversion from the picture domain to the transform domain, that is, convert the converted data 10C obtained in S706 from the picture domain to the transform domain to obtain the converted data 10$d$.

In a possible manner, the converted data 10C represented by the two-dimensional picture may be decomposed to obtain a spherical harmonic function basis and a spherical harmonic function basis coefficient. The spherical harmonic function basis coefficient may be used as the converted data 10$d$.

In a possible manner, the converted data 10C represented by the two-dimensional picture may be decomposed to obtain an eigenvector and an eigenvector coefficient. The eigenvector and the eigenvector coefficient may be used as the converted data 10$d$.

In a possible manner, the converted data 10C represented by the two-dimensional picture may be decomposed to obtain a spherical wavelet basis and a spherical wavelet basis coefficient. The spherical wavelet basis coefficient may be used as the converted data 10$d$.

S708: Perform uniform quantization, that is, perform uniform quantization on the converted data 10$d$ obtained in S707 to obtain converted data 12.

S709: Pad the data to the YUV plane, that is, pad the converted data 12 obtained in S708 to the YUV plane to obtain intermediate data.

S710: Perform HEVC encoding, that is, perform HEVC encoding on the intermediate data obtained in S709 to obtain a bitstream corresponding to the illumination data.

For example, for S708 to S710, refer to the foregoing descriptions of S507 to S509.

It should be noted that a sequence of the seven steps S702 to S708 may be randomly changed. This is not limited in the present disclosure. When S707 is performed before S704, S704 may be replaced with S604.

The following describes in detail a process of encoding the visibility data by using an encoding procedure shown in FIG. 4G as an example.

Figure 8:
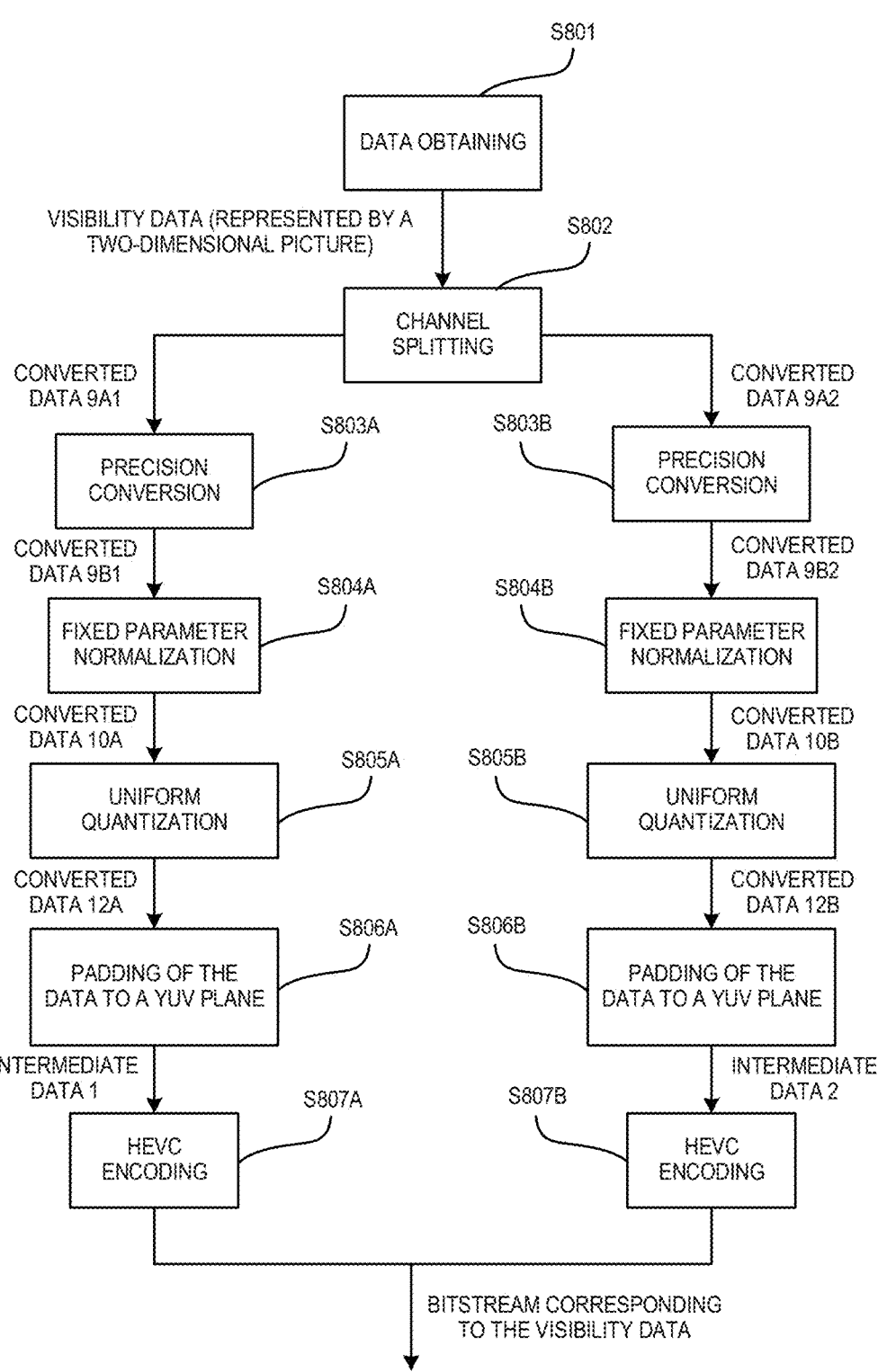
FIG. 8 is a diagram of an example of an encoding procedure.

FIG. 8 is a schematic diagram of an example of an encoding procedure. The encoding procedure may include S801: Obtain data; S802: Perform channel splitting; S803A: Perform precision conversion; S803B: Perform precision conversion; S804A: Perform fixed parameter normalization; S804B: Perform fixed parameter normalization; S805A: Perform uniform quantization; S805B: Perform uniform quantization; S806A: Pad data to a YUV plane; S806B: Pad data to the YUV plane; S807A: Perform HEVC encoding; and S807B: Perform HEVC encoding. In an embodiment in FIG. 8, visibility data is represented by a two-dimensional picture. The converted data 9 includes converted data 9A1, converted data 9A2, converted data 9B1, and converted data 9B2. The converted data 10 includes converted data 10A and converted data 10B. The converted data 12 includes converted data 12A and converted data 12B. Intermediate data may include intermediate data 1 and intermediate data 2.

S801: Obtain the data, that is, obtain the visibility data, where the visibility data is a two-dimensional picture in which a single pixel includes two channels of R and G.

For example, visibility data of K probes may be a two-dimensional picture in which a single pixel includes the two channels of R and G. In a possible manner, the R channel corresponds to distance data, and the G channel corresponds to a square of the distance data. In a possible manner, the G channel corresponds to distance data, and the R channel corresponds to a square of the distance data. Each probe corresponds to a plurality of pixels in the two-dimensional picture.

S802: Perform channel splitting, that is, perform channel splitting on the visibility data obtained in S801 to obtain the converted data 9A1 and the converted data 9A2.

For example, channel splitting may be performed on the visibility data, and the visibility data is split into two independent channels. Data corresponding to the R channel obtained through channel splitting may be referred to as the converted data 9A1, and data corresponding to the G channel obtained through channel splitting may be referred to as the converted data 9A2.

S803A: Perform precision conversion, that is, convert the converted data 9A1 obtained in S802 to preset precision to obtain the converted data 9B1.

S803B: Perform precision conversion, that is, convert the converted data 9A2 obtained in S802 to preset precision to obtain the converted data 9B2.

For example, for S803A and S803B, refer to the foregoing descriptions of S503.

It should be noted that S803A and S803B may be performed in parallel, or may be performed in series. This is not limited in the present disclosure.

S804A: Perform fixed parameter normalization, that is, perform fixed parameter normalization on the converted data 9B1 obtained in S803A to obtain the converted data 10A.

For example, a preset fixed parameter may be set based on a maximum distance value. The maximum distance value may be set based on a requirement, for example, may be set to 1.5 times a probe spacing in a 3D scene. This is not limited in the present disclosure. For a specific normalization process, refer to the foregoing descriptions of S504.

For example, data obtained by performing fixed parameter normalization on the converted data 9B1 may be referred to as the converted data 10A, and the converted data 10A belongs to [0, 1].

It should be noted that, when data of a channel of a pixel is greater than the normalization parameter, the data of the channel of the pixel may be truncated, so that the data of the channel of the pixel is equal to the normalization parameter. Then, the data of the channel of the pixel is divided by the normalization parameter to normalize the data of the channel of the pixel. In this case, the data of the channel of the pixel is normalized to 1.

S804B: Perform fixed parameter normalization, that is, perform fixed parameter normalization on the converted data 9B2 obtained in S803B to obtain the converted data 10B.

For example, a square of the maximum distance value may be preset as the normalization parameter. Then, maximum normalization may be performed on the converted data 9B2 with reference to S804A to obtain the converted data 10B.

It should be noted that S804A and S804B may be performed in parallel, or may be performed in series. This is not limited in the present disclosure.

S805A: Perform uniform quantization, that is, perform uniform quantization on the converted data 10A obtained in S804A to obtain the converted data 12A.

S805B: Perform uniform quantization, that is, perform uniform quantization on the converted data 10B obtained in S804B to obtain the converted data 12B.

For example, for S805A and S805B, refer to the foregoing descriptions of S507.

It should be noted that S805A and S805B may be performed in parallel, or may be performed in series. This is not limited in the present disclosure.

S806A: Pad the data to the YUV plane, that is, pad the converted data 12A obtained in S805A to the YUV plane to obtain the intermediate data 1.

S806B: Pad the data to the YUV plane, that is, pad the converted data 12B obtained in S805B to the YUV plane to obtain the intermediate data 2.

For example, for S806A and S806B, refer to the foregoing descriptions of S508.

It should be noted that S806A and S806B may be performed in parallel, or may be performed in series. This is not limited in the present disclosure.

S807A: Perform HEVC encoding, that is, perform HEVC encoding on the intermediate data 1 obtained in S806A to obtain a corresponding bitstream.

S807B: Perform HEVC encoding, that is, perform HEVC encoding on the intermediate data 2 obtained in S806B to obtain a corresponding bitstream.

For example, the bitstream obtained by encoding the intermediate data 1 and the bitstream obtained by encoding the intermediate data 2 may be referred to as bitstreams corresponding to the visibility data.

It should be noted that S807A and S807B may be performed in parallel, or may be performed in series. This is not limited in the present disclosure.

Figure 9:
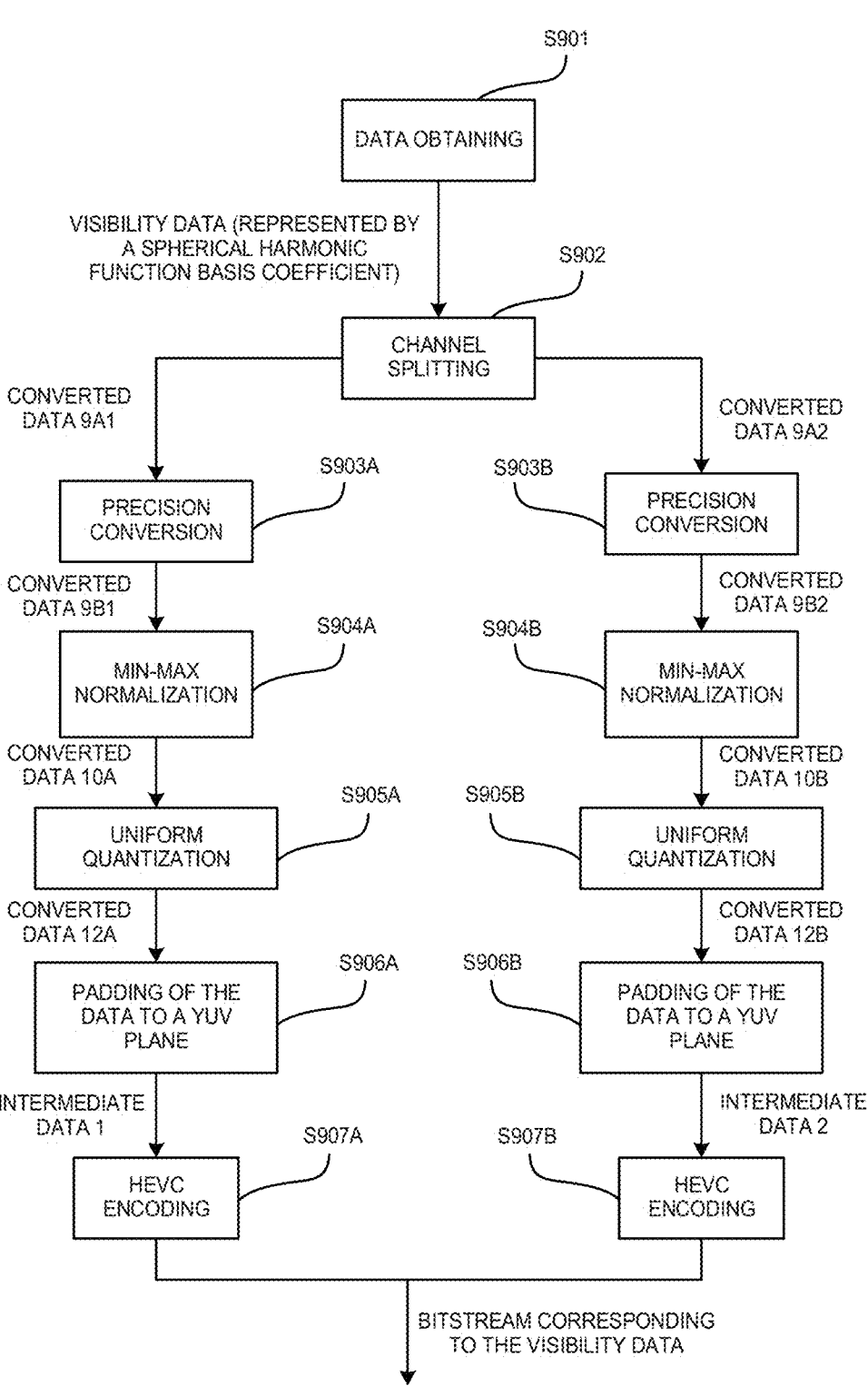
FIG. 9 is a diagram of an example of an encoding procedure.

FIG. 9 is a schematic diagram of an example of an encoding procedure. The encoding procedure may include S901: Obtain data; S902: Perform channel splitting; S903A: Perform precision conversion; S903B: Perform precision conversion; S904A: Perform min-max normalization; S904B: Perform min-max normalization; S905A: Perform uniform quantization; S905B: Perform uniform quantization; S906A: Pad data to a YUV plane; S906B: Pad data to the YUV plane; S907A: Perform HEVC encoding; and S907B: Perform HEVC encoding. In an embodiment in FIG. 9, visibility data is represented by a spherical harmonic function basis coefficient. The converted data 9 includes converted data 9A1, converted data 9A2, converted data 9B1, and converted data 9B2. The converted data 10 includes converted data 10A and converted data 10B. The converted data 12 includes converted data 12A and converted data 12B. Intermediate data may include intermediate data 1 and intermediate data 2.

S901: Obtain the data, that is, obtain the visibility data, where the visibility data includes two channels of R and G, and each channel is represented by the spherical harmonic function basis coefficient.

For example, the visibility data of each probe includes the two channels of R and G, where data of each channel includes x spherical harmonic function basis coefficients. In a possible manner, the R channel corresponds to distance data, and the G channel corresponds to a square of the distance data. In a possible manner, the G channel corresponds to distance data, and the R channel corresponds to a square of the distance data.

S902: Perform channel splitting, that is, perform channel splitting on the visibility data obtained in S901 to obtain the converted data 9A1 and the converted data 9A2.

S903A: Perform precision conversion, that is, convert the converted data 9A1 obtained in S902 to preset precision to obtain the converted data 9B1.

S903B: Perform precision conversion, that is, convert the converted data 9A2 obtained in S902 to preset precision to obtain the converted data 9B2.

For example, for S903A and S903B, refer to the foregoing descriptions of S503.

It should be noted that S903A and S903B may be performed in parallel, or may be performed in series. This is not limited in the present disclosure.

S904A: Perform min-max normalization, that is, perform min-max normalization on the converted data 9B1 obtained in S903A to obtain the converted data 10A.

S904B: Perform min-max normalization, that is, perform min-max normalization on the converted data 9B2 obtained in S903B to obtain the converted data 10B.

For example, for S904A and S904B, refer to the foregoing descriptions of S604.

It should be noted that S904A and S904B may be performed in parallel, or may be performed in series. This is not limited in the present disclosure.

S905A: Perform uniform quantization, that is, perform uniform quantization on the converted data 10A obtained in S904A to obtain the converted data 12A.

S905B: Perform uniform quantization, that is, perform uniform quantization on the converted data 10B obtained in S904B to obtain the converted data 12B.

For example, for S905A and S905B, refer to the foregoing descriptions of S507.

It should be noted that S905A and S905B may be performed in parallel, or may be performed in series. This is not limited in the present disclosure.

S906A: Pad the data to the YUV plane, that is, pad the converted data 12A obtained in S905A to the YUV plane to obtain the intermediate data 1.

S906B: Pad the data to the YUV plane, that is, pad the converted data 12B obtained in S905B to the YUV plane to obtain the intermediate data 2.

For example, for S906A and S906B, refer to the foregoing descriptions of S508.

It should be noted that S906A and S906B may be performed in parallel, or may be performed in series. This is not limited in the present disclosure.

S907A: Perform HEVC encoding, that is, perform HEVC encoding on the intermediate data 1 obtained in S906A to obtain a corresponding bitstream.

S907B: Perform HEVC encoding, that is, perform HEVC encoding on the intermediate data 2 obtained in S906B to obtain a corresponding bitstream.

For example, the bitstream obtained by encoding the intermediate data 1 and the bitstream obtained by encoding the intermediate data 2 may be referred to as bitstreams corresponding to the visibility data.

It should be noted that S907A and S907B may be performed in parallel, or may be performed in series. This is not limited in the present disclosure.

Figure 10:
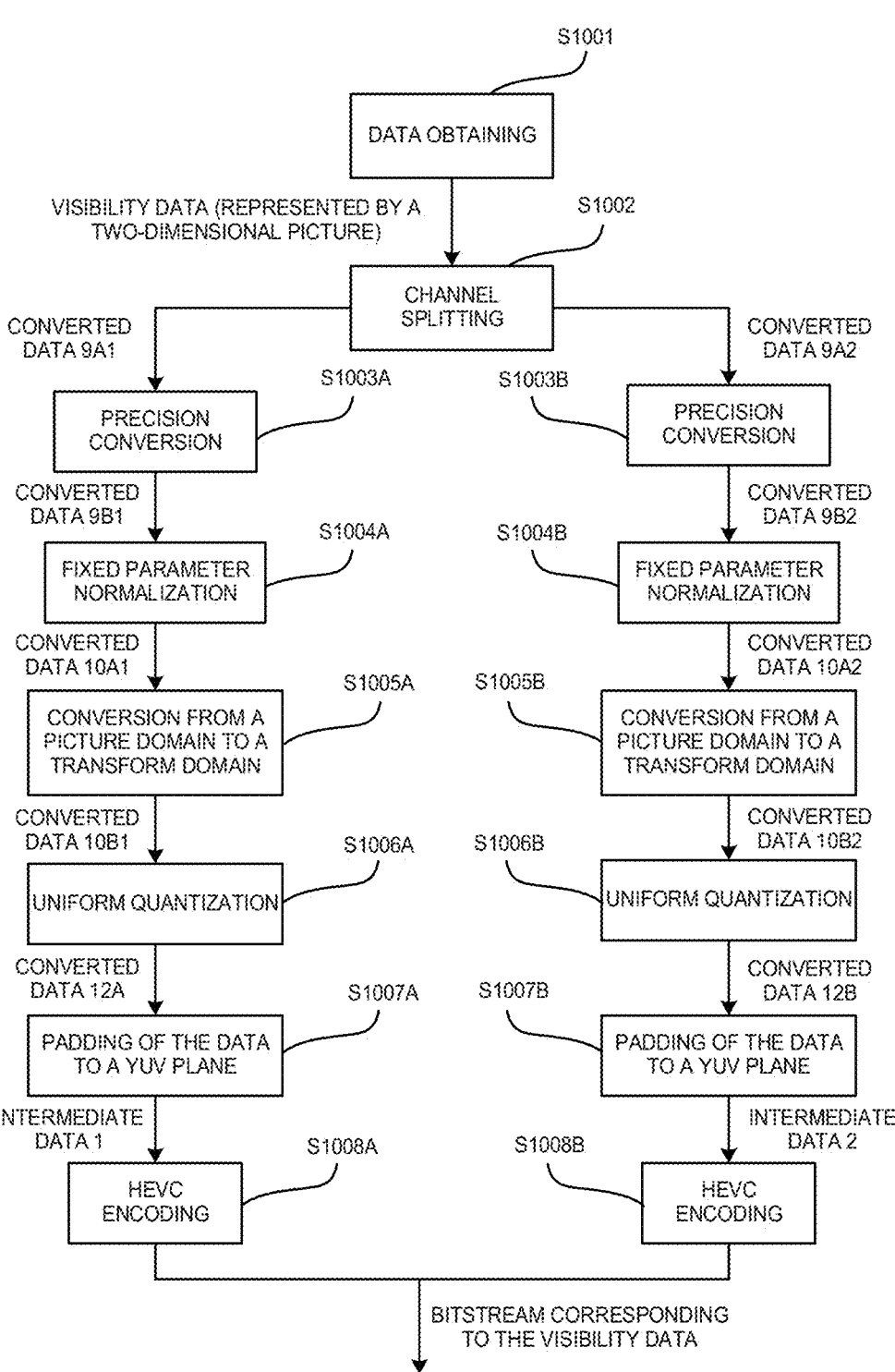
FIG. 10 is a diagram of an example of an encoding procedure.

FIG. 10 is a schematic diagram of an example of an encoding procedure. The encoding procedure may include S1001: Obtain data; S1002: Perform channel splitting; S1003A: Perform precision conversion; S1003B: Perform precision conversion; S1004A: Perform fixed parameter normalization; S1004B: Perform fixed parameter normalization; S1005A: Perform conversion from a picture domain to a transform domain; S1005B: Perform conversion from the picture domain to the transform domain; S1006A: Perform uniform quantization; S1006B: Perform uniform quantization; S1007A: Pad data to a YUV plane; S1007B: Pad data to the YUV plane; S1008A: Perform HEVC encoding; and S1008B: Perform HEVC encoding. In an embodiment in FIG. 10, visibility data is represented by a two-dimensional picture. The converted data 9 includes converted data 9A1, converted data 9A2, converted data 9B1, and converted data 9B2. The converted data 10 includes converted data 10A1, converted data 10A2, converted data 10B1, and converted data 10B2. The converted data 12 includes converted data 12A and converted data 12B. Intermediate data may include intermediate data 1 and intermediate data 2.

S1001: Obtain the data, that is, obtain the visibility data, where the visibility data is a two-dimensional picture in which a single pixel includes two channels of R and G.

S1002: Perform channel splitting, that is, perform channel splitting on the visibility data obtained in S1001 to obtain the converted data 9A1 and the converted data 9A2.

S1003A: Perform precision conversion, that is, convert the converted data 9A1 obtained in S1002 to preset precision to obtain the converted data 9B1.

S1003B: Perform precision conversion, that is, convert the converted data 9A2 obtained in S1002 to preset precision to obtain the converted data 9B2.

S1004A: Perform fixed parameter normalization, that is, perform fixed parameter normalization on the converted data 9B1 obtained in S1003A to obtain the converted data 10A1.

S1004B: Perform fixed parameter normalization, that is, perform fixed parameter normalization on the converted data 9B2 obtained in S1003B to obtain the converted data 10A2.

For example, for S1001, S1002, S1003A, S1003B, S1004A, and S1004B, refer to the foregoing descriptions of S801, S802, S803A, S803B, S804A, and S804B.

S1005A: Perform conversion from the picture domain to the transform domain, that is, convert the converted data 10A1 obtained in S1004A from the picture domain to the transform domain to obtain the converted data 10B1.

S1005A: Perform conversion from the picture domain to the transform domain, that is, convert the converted data 10A2 obtained in S1004B from the picture domain to the transform domain to obtain the converted data 10B2.

For example, for S1005A and S1005B, refer to the foregoing descriptions of S707. This is not limited in the present disclosure.

It should be noted that S1005A and S1005B may be performed in parallel, or may be performed in series. This is not limited in the present disclosure.

S1006A: Perform uniform quantization, that is, perform uniform quantization on the converted data 10B1 obtained in S1005A to obtain the converted data 12A.

S1006B: Perform uniform quantization, that is, perform uniform quantization on the converted data 10B2 obtained in S1005B to obtain the converted data 12B.

For example, for S1006A and S1006B, refer to the foregoing descriptions of S507.

It should be noted that S1006A and S1006B may be performed in parallel, or may be performed in series. This is not limited in the present disclosure.

S1007A: Pad the data to the YUV plane, that is, pad the converted data 12A obtained in S1006A to the YUV plane to obtain the intermediate data 1.

S1007B: Pad the data to the YUV plane, that is, pad the converted data 12B obtained in S1006B to the YUV plane to obtain the intermediate data 2.

For example, for S1007A and S1007B, refer to the foregoing descriptions of S508.

It should be noted that S1007A and S1007B may be performed in parallel, or may be performed in series. This is not limited in the present disclosure.

S1008A: Perform HEVC encoding, that is, perform HEVC encoding on the intermediate data 1 obtained in S1007A to obtain a corresponding bitstream.

S1008B: Perform HEVC encoding, that is, perform HEVC encoding on the intermediate data 2 obtained in S1007B to obtain a corresponding bitstream.

For example, the bitstream obtained by encoding the intermediate data 1 and the bitstream obtained by encoding the intermediate data 2 may be referred to as bitstreams corresponding to the visibility data.

It should be noted that S1008A and S1008B may be performed in parallel, or may be performed in series. This is not limited in the present disclosure.

It should be noted that S1008A and S1008B may be encoded by using two encoding modules (S807A and S807B may also be encoded by using the two encoding modules; and S907A and S907B may also be encoded by using the two encoding modules). A similarity between distance data and a similarity between squares of the distance data are higher relative to a similarity between the distance data and the square of the distance data. In this way, it is easier to use the two encoding modules to separately perform inter-frame encoding on the distance data and perform inter-frame encoding on the square of the distance data, thereby further reducing a bit rate under same rendering effect.

It should be noted that channel splitting may be performed on the visibility data after the steps of precision conversion, normalization, and quantization are performed. In addition, S1002 (S802, or S902) may not be performed, that is, the steps of precision conversion, normalization, and quantization are directly performed on the visibility data including the two channels of R and G. Then, the data of the two channels of R and G in the visibility data is padded to the same YUV plane, and the intermediate data is encoded. This is not limited in the present disclosure.

The following describes in detail a process of encoding the probe data by using an encoding procedure shown in FIG. 4D as an example.

Figure 11:
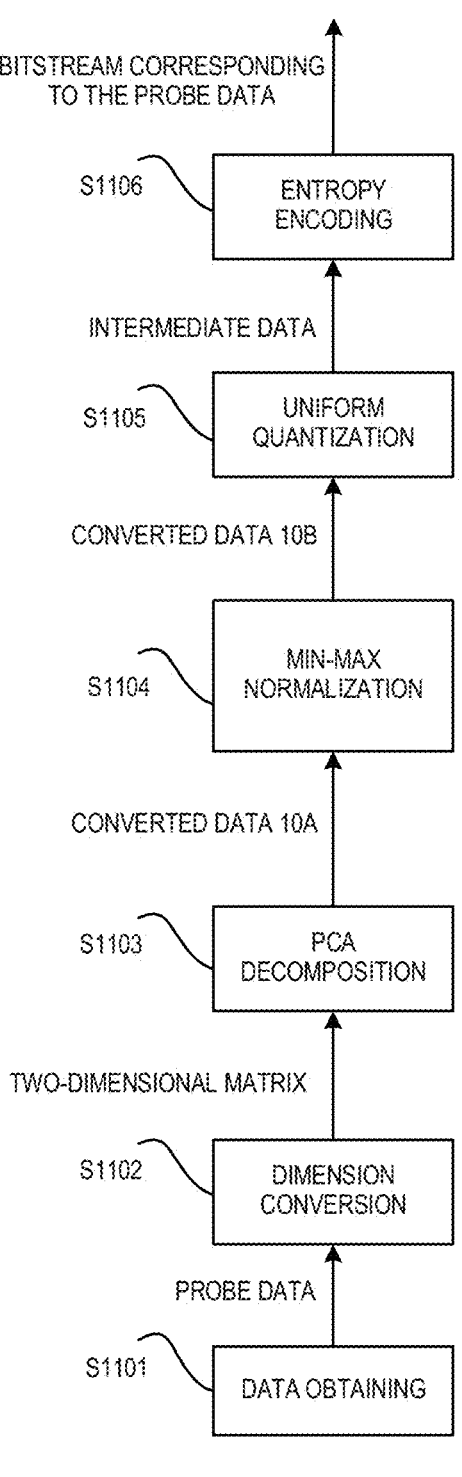
FIG. 11 is a diagram of an example of an encoding procedure.

FIG. 11 is a schematic diagram of an example of an encoding procedure. The encoding procedure may include S1101: Obtain data; S1102: Perform dimension conversion; S1103: Perform PCA decomposition; S1104: Perform min-max normalization; S1105: Perform uniform quantization; and S1106: Perform entropy encoding. In an embodiment in FIG. 11, the probe data may include illumination data and/or visibility data. The converted data 10 may include converted data 10A and converted data 10B.

S1101: Obtain the data, that is, obtain the probe data.

For example, in the embodiment in FIG. 11, the probe data includes the illumination data and/or the visibility data. The illumination data may be represented by a two-dimensional picture or a spherical harmonic function basis (or spherical wavelet basis) coefficient. The visibility data may be represented by a two-dimensional picture or a spherical harmonic function basis (or spherical wavelet basis) coefficient. This is not limited in the present disclosure.

S1102: Perform dimension conversion, that is, perform dimension conversion on the probe data obtained in S1101 to obtain a two-dimensional matrix.

For example, when the illumination data is represented by the two-dimensional picture, for a pixel in the two-dimensional picture, data of an R channel of the pixel may be used as an element of the two-dimensional matrix, data of a G channel of the pixel may be used as an element of the two-dimensional matrix, and data of a B channel of the pixel may be used as an element of the two-dimensional matrix.

For example, when the illumination data is represented by the spherical harmonic function basis coefficient (or the spherical wavelet basis coefficient), for each probe, a spherical harmonic function basis (or spherical wavelet basis) coefficient of each spherical harmonic function basis (or spherical wavelet basis) of an R channel of the probe may be used as an element of the two-dimensional matrix, that is, n elements may be obtained. A spherical harmonic function basis (or spherical wavelet basis) coefficient of each spherical harmonic function basis (or spherical wavelet basis) of a G channel of the probe may be used as an element of the two-dimensional matrix, where n elements may also be obtained. A spherical harmonic function basis (or spherical wavelet basis) coefficient of each spherical harmonic function basis (or spherical wavelet basis) of a B channel of the probe may be used as an element of the two-dimensional matrix, where n elements may also be obtained. In this way, for the probe, the illumination data of the probe may be expanded into 3n elements of the two-dimensional matrix.

For example, spherical harmonic function basis coefficients of same spherical harmonic function bases in all probes may be arranged in one row or one column. For example, spherical harmonic function basis coefficients of same spherical harmonic function bases of same channels in all the probes may also be arranged in one row or one column. This is not limited in the present disclosure.

For example, a manner of converting the visibility data to the two-dimensional matrix is similar to a manner of converting the illumination data to the two-dimensional matrix.

For example, the illumination data may be converted to a two-dimensional matrix, and the visibility data may be converted to another two-dimensional matrix.

It should be noted that, in a process of converting the probe data to the two-dimensional matrix, if the probe data cannot be directly converted to the two-dimensional matrix of a preset size, a deficient part may be supplemented by using invalid data. The preset size may be set based on a requirement. This is not limited in the present disclosure.

For example, the obtained two-dimensional matrix is the foregoing converted data 9.

It should be noted that a matrix of other dimensions (for example, a 5-dimensional matrix) may also be obtained by performing dimension conversion on the probe data. This is not limited in the present disclosure. The following uses an example in which dimension conversion is performed on the probe data to obtain the two-dimensional matrix for description.

S1103: Perform PCA decomposition, that is, perform PCA decomposition on the two-dimensional matrix obtained in S1102 to obtain the converted data 10A.

For example, PCA decomposition may be performed on the two-dimensional matrix to decompose the two-dimensional matrix into an eigenvector and an eigenvector coefficient. Then, the eigenvector and the eigenvector coefficient are used as the converted data 10A.

S1104: Perform min-max normalization, that is, perform min-max normalization on the converted data 10A obtained in S1103 to obtain the converted data 10B.

For example, min-max normalization may be separately performed on the eigenvector and the eigenvector coefficient in the converted data 10A. For details, refer to the foregoing descriptions of the min-max normalization.

S1105: Perform uniform quantization, that is, perform uniform quantization on the converted data 10B obtained in S1104 to obtain intermediate data.

For example, uniform quantization may be separately performed on the eigenvector and the eigenvector coefficient in the converted data 10B. For details, refer to the foregoing descriptions of the uniform quantization in S507.

S1106: Perform entropy encoding, that is, perform entropy encoding on the intermediate data obtained in S1105 to obtain a corresponding bitstream.

For example, when the probe data is the illumination data, entropy encoding may be performed on the illumination data to obtain a bitstream corresponding to the illumination data.

For example, when the probe data is the visibility data, entropy encoding may be performed on the visibility data to obtain a bitstream corresponding to the visibility data.

For example, when the probe data is the illumination data and the visibility data, entropy encoding may be performed on the illumination data to obtain the bitstream corresponding to the illumination data, and entropy encoding may be performed on the visibility data to obtain the bitstream corresponding to the visibility data.

For example, load balancing may be performed based on a data amount of the probe data to determine a target bit rate and an encoding scheme of the probe data.

In a possible manner, a first target bit rate corresponding to the illumination data and a second target bit rate corresponding to the visibility data may be determined based on a data amount of the illumination data, a data amount of the visibility data, and a preset bit rate. In this way, subsequently, intermediate data corresponding to the illumination data may be encoded based on the first target bit rate, and intermediate data corresponding to the visibility data may be encoded based on the second target bit rate, to obtain the bitstream. The preset bit rate may be set based on a require-
ment. This is not limited in the present disclosure.

For example, the first target bit rate and the second target
bit rate may be determined based on a ratio of the data
amount of the illumination data to the data amount of the
visibility data. It is assumed that the preset bit rate is 1000
kbps. If the ratio of the data amount of the illumination data
to the data amount of the visibility data is 9:1, it may be
determined that the first target bit rate is 900 kbps, and the
second target bit rate is 100 kbps.

In this way, appropriate bit rates may be allocated to the
illumination data and the visibility data. In comparison with
a case in which a ratio of the bitstream corresponding to the
illumination data to the bitstream corresponding to the
visibility data is fixed, in the present disclosure, rendering
effect can be improved when bitstreams are the same.

In a possible manner, an encoding scheme corresponding
to the illumination data and an encoding scheme correspond-
ing to the visibility data are determined based on the data
amount of the illumination data, the data amount of the
visibility data, and channel feedback information. The
encoding scheme includes intra-frame encoding or inter-
frame encoding. In this way, subsequently, the intermediate
data corresponding to the illumination data may be encoded
by using the encoding scheme corresponding to the illumi-
nation data, and the intermediate data corresponding to the
visibility data may be encoded by using the encoding
scheme corresponding to the visibility data, to obtain the
bitstream. In this way, a bitstream size and the rendering
effect can be balanced.

For example, a bit rate that can be carried by a channel
may be determined based on the channel feedback informa-
tion, and then whether intra-frame encoding or inter-frame
encoding is performed on the illumination data is deter-
mined based on the data amount of the illumination data and
the bit rate that can be carried by the channel. For example,
a predicted bit rate of a corresponding bitstream after
intra-frame encoding is performed on the illumination data
may be estimated. If the predicted bit rate is less than or
equal to the bit rate that can be carried by the channel,
intra-frame encoding may be performed on the illumination
data. If the preset bit rate is greater than a bitstream that can
be carried by the channel, inter-frame encoding may be
performed on the illumination data. Similarly, whether intra-
frame encoding or inter-frame encoding is performed on the
visibility data may also be determined in the foregoing
manner. This is not limited in the present disclosure.

For example, first attribute data (for example, a normal-
ization parameter (a parameter used for normalization), a
quantization parameter (a parameter used for quantization),
a color space conversion parameter (a parameter used for
conversion from an RGB domain to a YUV/XYZ/Lab
domain), an exponential conversion parameter (a parameter
used for conversion from a linear domain to an exponential
domain), a PQ conversion parameter (a parameter, for
example, a parameter related to a PQ curve, used for
conversion from the linear domain to a PQ domain), an HLG
conversion parameter (a parameter, for example, a param-
eter related to an HLG curve, used for conversion from the
linear domain to an HLG domain), or the like) used to
perform data form conversion on the probe data may also be
sent to a second device, so that the second device performs
data form conversion based on the first attribute data to
restore the probe data.

For example, second attribute data used in a rendering
process may also be sent to the second device, so that the
second device performs rendering based on the second
attribute data.

In a possible manner, attribute data of K probes may be
encoded to obtain a bitstream corresponding to the attribute
data. For example, a manner of encoding the attribute data
of the K probes may be context encoding, or may be another
encoding manner. This is not limited in the present disclo-
sure.

In a possible manner, third manner rearrangement may be
performed on the attribute data of the K probes, and then the
rearranged attribute data is encoded into the corresponding
bitstream. The third manner rearrangement may be used for
concatenation, that is, the first attribute data and the second
attribute data may be concatenated, and then the concat-
enated data is encoded to obtain a corresponding bitstream.

In a possible manner, if a first device encodes only the
illumination data, the obtained bitstream includes the inter-
mediate data corresponding to the illumination data.

In a possible manner, if the first device encodes only the
visibility data, the obtained bitstream includes the interme-
diate data corresponding to the visibility data.

In a possible manner, if the first device encodes both the
illumination data and the visibility data, the obtained bit-
stream may include the intermediate data corresponding to
the visibility data and the intermediate data corresponding to
the illumination data.

In a possible manner, if the first device encodes the
illumination data and the attribute data, the obtained bit-
stream includes the intermediate data corresponding to the
illumination data and the attribute data.

In a possible manner, if the first device encodes only the
visibility data and the attribute data, the obtained bitstream
includes the intermediate data corresponding to the visibility
data and the attribute data.

In a possible manner, if the first device encodes the
illumination data, the visibility data, and the attribute data,
the obtained bitstream may include the intermediate data
corresponding to the visibility data, the intermediate data
corresponding to the illumination data, and the attribute
data.

For example, after the bitstream is obtained, bitstream
structure information may be generated based on a bitstream
structure, and then the bitstream structure information is
written into the foregoing obtained bitstream. For example,
the bitstream structure information may include but is not
limited to a quantity of probes, a location, a length, and a
data format of the intermediate data corresponding to the
illumination data, an execution sequence of data form con-
version types corresponding to the illumination data, a
location, a length, and a data format of the intermediate data
corresponding to the visibility data, an execution sequence
of data form conversion types corresponding to the visibility
data, a location, a length, and a data format of the first
attribute data, a location, a length, and a data format of the
second attribute data, and the like. This is not limited in the
present disclosure.

The data form conversion types may include various first
manner rearrangement types (for example, discarding of
data of some channels, channel splitting, precision conver-
sion, and dimension conversion), various normalization
types (for example, adaptive normalization, fixed parameter
normalization, the min-max normalization, and z-score nor-
malization), various domain conversion types (for example,
conversion from the linear domain to a non-linear domain,
the conversion from the RGB domain to the YUV domain, the conversion from the RGB domain to the XYZ domain, the conversion from the RGB domain to the Lab domain, and conversion from a picture domain to a transform domain), various quantization types (for example, the uniform quantization and non-uniform quantization), a second manner rearrangement type like padding data to a YUV plane, and the like. This is not limited in the present disclosure.

It should be understood that the bitstream structure information may include more or less information than the foregoing information. This is not limited in the present disclosure. In addition, the bitstream may alternatively not include the bitstream structure information. This may be specifically set based on a requirement. This is not limited in the present disclosure either.

It should be understood that locations of the intermediate data corresponding to the visibility data, the intermediate data corresponding to the illumination data, the attribute data, and the bitstream structure information in the bitstream are not limited in the present disclosure.

Figures 12, 13:
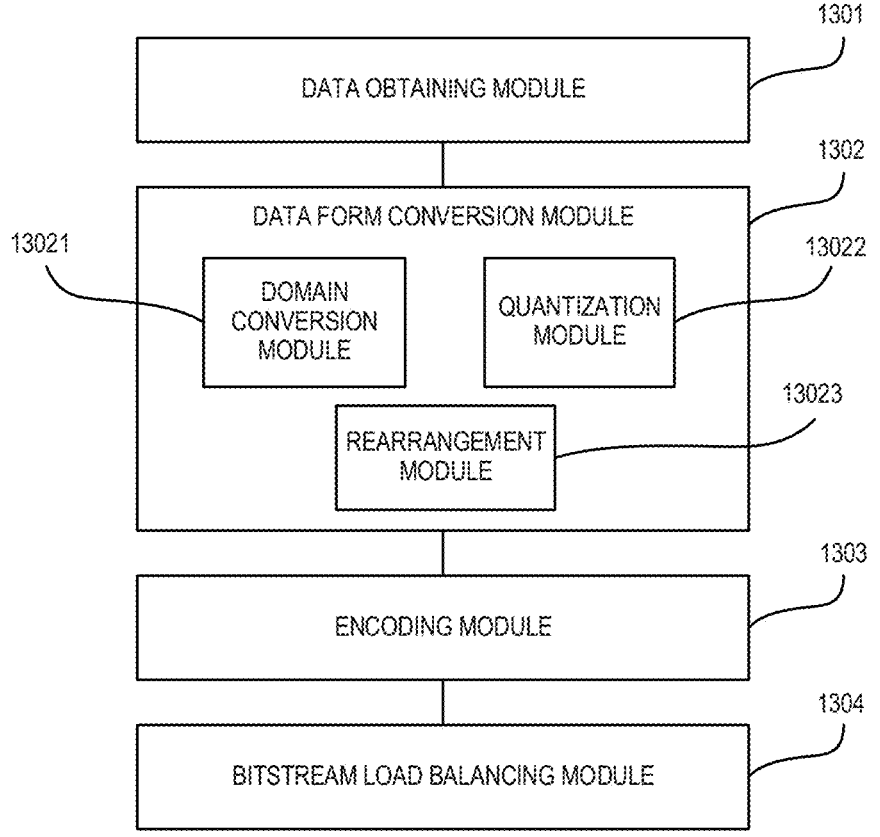
FIG. 12 is a diagram of an example of a structure of a bitstream.
FIG. 13 is a diagram of an example of an electronic device.

FIG. 12 is a diagram of an example of a structure of a bitstream. The bitstream shown in FIG. 12 includes intermediate data corresponding to visibility data, intermediate data corresponding to illumination data, attribute data, and bitstream structure information.

For example, after obtaining a bitstream corresponding to probe data, a first device may send the probe data to a second device. In this way, the second device may determine shading effect of an object in a 3D scene based on the probe data in a rendering process.

FIG. 13 is a diagram of an example of an electronic device. In an embodiment in FIG. 13, the electronic device is a first device, and may be configured to perform the method in the foregoing embodiments. Therefore, for beneficial effect that can be achieved by the electronic device, refer to beneficial effect in the corresponding method provided above. The first device may include: a data obtaining module 1301 configured to obtain probe data, where the probe data corresponds to one or more probes in a 3D scene, and the probe data is used by a second device to determine shading effect of an object in the 3D scene in a rendering process; a data form conversion module 1302 configured to perform data form conversion on the probe data to obtain intermediate data, where the data form conversion includes domain conversion; and an encoding module 1303 configured to encode the intermediate data to obtain a corresponding bitstream.

For example, the data form conversion module 1302 includes: a domain conversion module 13021 configured to: perform first processing on the probe data to obtain converted data, where the first processing is domain conversion; or perform second processing on the converted data to obtain the intermediate data, where the second processing is the domain conversion; a quantization module 13022 configured to: perform first processing on the probe data to obtain converted data, where the first processing is quantization; or perform second processing on the converted data to obtain the intermediate data, where the second processing is the quantization; and a rearrangement module 13023 configured to: perform first processing on the probe data to obtain converted data, where the first processing is first manner rearrangement; or perform second processing on the converted data to obtain the intermediate data, where the second processing is the first manner rearrangement.

For example, the domain conversion module 13021 is further configured to perform third processing on the probe data before performing first processing on the probe data. The third processing is the domain conversion.

For example, the quantization module 13022 is further configured to perform third processing on the probe data before performing first processing on the probe data. The third processing is the quantization.

For example, the rearrangement module 13023 is further configured to perform third processing on the probe data before performing first processing on the probe data. The third processing is the first manner rearrangement.

For example, the rearrangement module is further configured to: after performing second processing on the converted data and before obtaining the intermediate data, perform second manner rearrangement on the data obtained through second processing to obtain the intermediate data. The second manner rearrangement is padding the data obtained through second processing to a YUV plane.

For example, when the probe data is the illumination data, and when the illumination data includes a plurality of channels, the first manner rearrangement includes at least one of the following: discarding data of some channels, converting the illumination data to preset precision, or performing dimension conversion on the illumination data.

For example, when the probe data is the visibility data, and when the visibility data includes a plurality of channels, the first manner rearrangement includes at least one of the following: performing channel splitting, converting the visibility data to preset precision, or performing dimension conversion on the visibility data.

For example, the domain conversion includes at least one of the following: conversion from a non-normalized domain to a normalized domain, conversion from a linear domain to a non-linear domain, conversion from an RGB domain to a YUV domain, conversion from an RGB domain to an XYZ domain, conversion from an RGB domain to a Lab domain, and conversion from a picture domain to a transform domain.

For example, the probe data is represented by a two-dimensional picture, or a spherical harmonic function basis coefficient, or a spherical wavelet basis coefficient.

For example, the encoding module 1302 is further configured to encode attribute data of the one or more probes to obtain the bitstream. The attribute data includes first attribute data for the data form conversion and/or second attribute data used in the rendering process.

For example, when the probe data includes the illumination data and the visibility data, the bitstream includes bitstream structure information, and the bitstream structure information includes a location of intermediate data corresponding to the illumination data and/or a location of intermediate data corresponding to the visibility data.

For example, the first electronic device further includes: a bitstream load balancing module 1304 configured to: when the probe data includes the illumination data and the visibility data, determine, based on a data amount of the illumination data, a data amount of the visibility data, and a preset bit rate, a first target bit rate corresponding to the illumination data and a second target bit rate corresponding to the visibility data.

The encoding module 1303 is specifically configured to: encode, based on the first target bit rate, the intermediate data corresponding to the illumination data, and encode, based on the second target bit rate, the intermediate data corresponding to the visibility data, to obtain the bitstream.

For example, the bitstream load balancing module 1304 is further configured to: when the probe data includes the illumination data and the visibility data, determine, based on the data amount of the illumination data, the data amount of the visibility data, and channel feedback information, an encoding scheme corresponding to the illumination data and an encoding scheme corresponding to the visibility data. The encoding scheme includes intra-frame encoding or inter-frame encoding.

The encoding module 1303 is specifically configured to: encode, by using the encoding scheme corresponding to the illumination data, the intermediate data corresponding to the illumination data, and encode, by using the encoding scheme corresponding to the visibility data, the intermediate data corresponding to the visibility data, to obtain the bitstream.

Figure 14A:
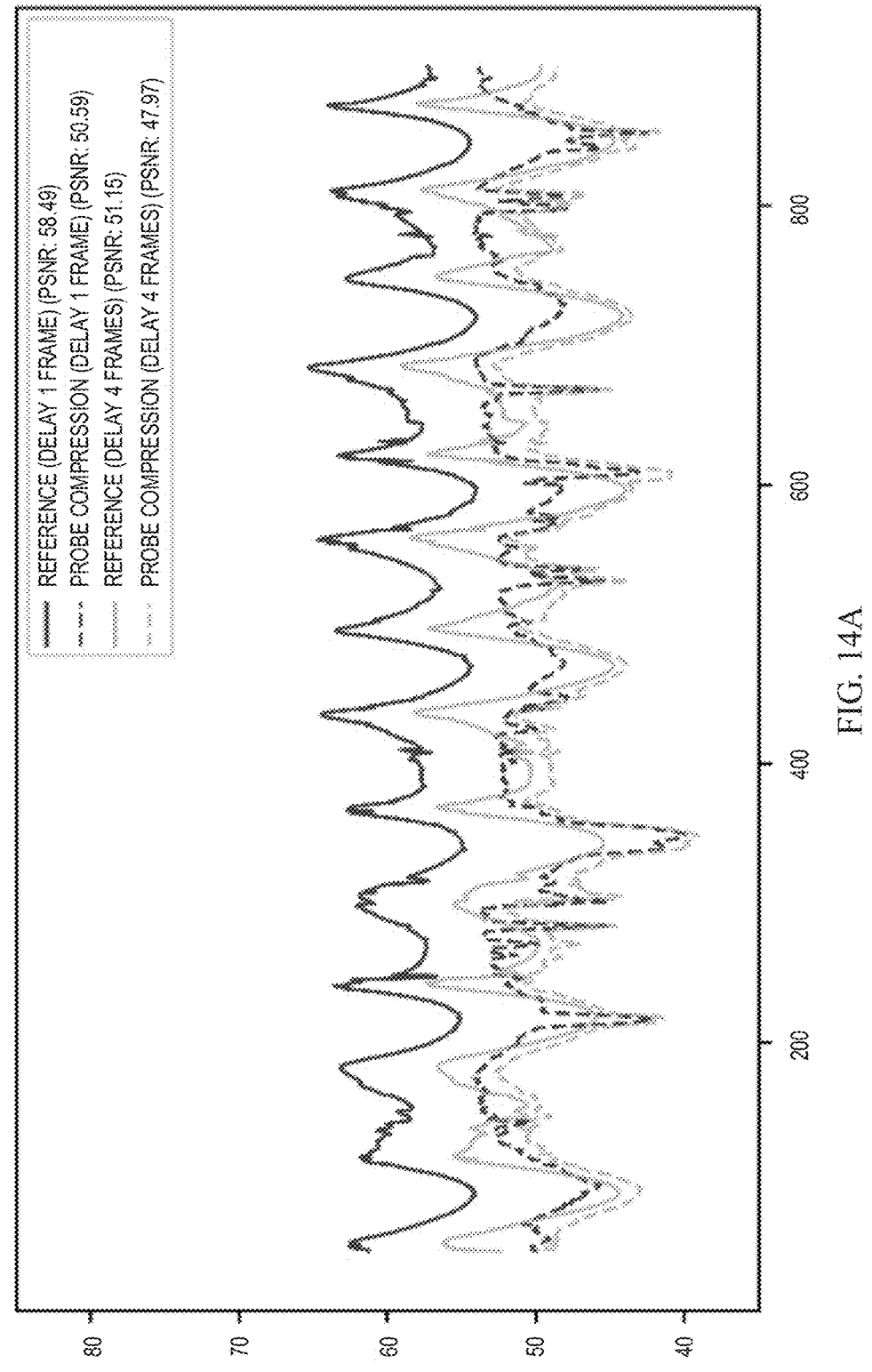
FIG. 14A is a diagram of an example of compression effect.

FIG. 14A is a diagram of an example of compression effect. FIG. 14A shows a PSNR (peak signal to noise ratio, peak signal to noise ratio) curve corresponding to lossless compression and a PSNR curve corresponding to the encoding method in the present disclosure. The PSNR may represent a difference between an unprocessed picture (in FIG. 14A, referring to a picture obtained before compression is performed on an encoder side) and a processed picture (in FIG. 14A, referring to a picture obtained by a decoder side by decoding a bitstream sent by the encoder side). A larger PSNR indicates a smaller loss of the processed picture compared with the unprocessed picture. The PSNR can be used to measure quality or rendering effect of the pictures obtained through compression and decompression. In FIG. 14A, a vertical coordinate is the PSNR, and a horizontal coordinate is a frame quantity.

Refer to FIG. 14A. For example, a curve corresponding to a reference (delay 1 frame) is a PSNR curve corresponding to lossless compression in a case in which one frame is delayed, and an average PSNR of the lossless compression is 58.49 decibel (dB). A curve corresponding to probe compression (delay 1 frame) is a PSNR curve corresponding to lossy compression performed by using the encoding method in the present disclosure in a case in which one frame is delayed, and an average PSNR of the lossy compression is 50.59 dB. A curve corresponding to a reference (delay 4 frames) is a PSNR curve corresponding to lossless compression in a case in which four frames are delayed, and an average PSNR of the lossless compression is 51.15 dB. A curve corresponding to probe compression (delay 4 frames) is a PSNR curve corresponding to lossy compression performed by using the encoding method in the present disclosure in a case in which four frames are delayed, and an average PSNR of the lossy compression is 47.97 dB.

It should be noted that, for two pictures whose PSNRs are greater than 40 dB, a difference perceived by a user on the two pictures is not obvious. It can be learned that the encoding method in the present disclosure does not significantly reduce rendering effect.

It should be noted that, after data form conversion processing is used, if lossy compression is performed, accuracy of probe data obtained through decoding by the decoder side is severely affected, and subsequently, the rendering effect is severely affected. After data form conversion processing provided in the present disclosure is used, both lossless compression and lossy compression may be performed on processed intermediate data. As shown in FIG. 14A, even if lossy compression is performed on the intermediate data obtained through data form conversion processing in the present disclosure, the decoder side can still obtain a high-quality picture, and the user can barely perceive a difference between rendering effect through naked eyes. However, in the method provided in the present disclosure, after data form conversion and lossy compression are performed on the probe data, a data amount is greatly reduced, a bit rate can be significantly reduced, and transmitted data can be reduced, thereby reducing a rendering delay of a client and improving user experience, especially in scenarios that have high requirements on real-time performance.

Figure 14B:
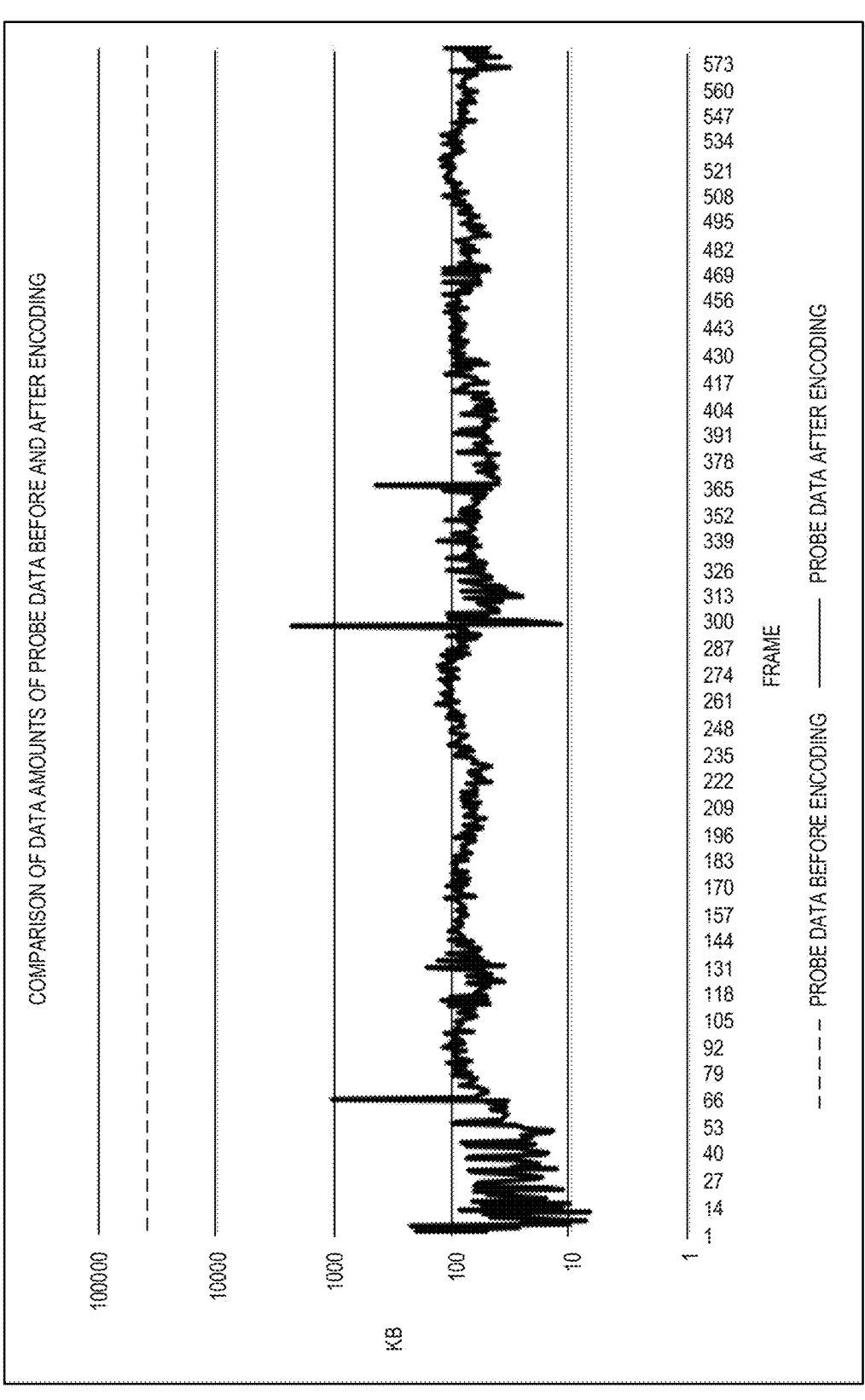
FIG. 14B is a diagram of an example of compression effect.

FIG. 14B is a diagram of an example of compression effect. In FIG. 14B, a vertical coordinate is a data amount in a unit of kb, and a horizontal coordinate is a frame.

Refer to FIG. 14B. For example, probe data before encoding is greater than 40000 kilobytes (KB). A data amount of the probe data that is obtained by using the encoding method in the present disclosure and in which most frames are encoded belongs to an interval of 8 KB to 100 KB, and a data amount of the probe data in which a small quantity of frames are encoded is about 2000 KB. It can be learned that a bit rate can be significantly reduced by using the encoding method in the present disclosure.

Figure 15:
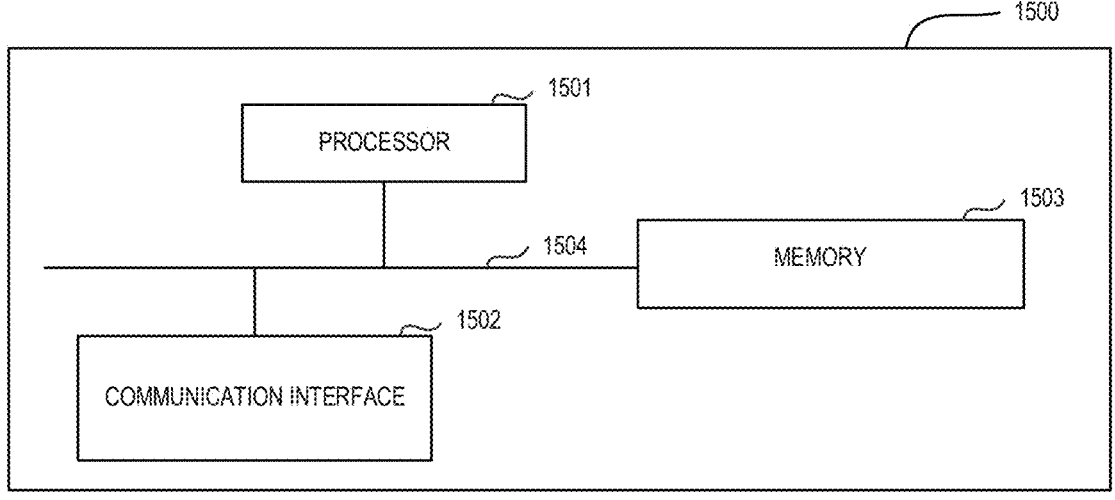
FIG. 15 is a diagram of an example of a structure of an apparatus.

In an example, FIG. 15 is a block diagram of an apparatus 1500 according to an embodiment of the present disclosure. The apparatus 1500 may include a processor 1501 and a communication interface 1502, and optionally, further include a memory 1503.

Components of the apparatus 1500 are coupled together through a bus 1504. In addition to a data bus, the bus 1504 further includes a power bus, a control bus, and a status signal bus. However, for clear description, various types of buses in the figure are referred to as the bus 1504 in the figure.

Optionally, the memory 1503 may be configured to store instructions in the foregoing method embodiments. The processor 1501 may be configured to: execute the instructions in the memory 1503, and control the communication interface to receive/send a signal.

The apparatus 1500 may be the electronic device or a chip of the electronic device in the foregoing method embodiments.

For example, the processor 1501 is configured to: process data, control data access and storage, issue a command, and control another components to perform an operation. The processor 1501 may be implemented as one or more processors, one or more controllers, and/or another structure that can be used to execute a program. The processor 1501 may further include at least one of a general purpose processor, a digital signal processor (DSP), an application-specific integrated circuit (ASIC), a field programmable gate array (FPGA), or another programmable logic component. The general purpose processor may include a microprocessor, a processor, controller, microcontroller or state machine. The processor 1501 may alternatively be implemented as a computing component, for example, a combination of the DSP and the microprocessor.

The memory 1503 may include a computer-readable storage medium, for example, a magnetic storage device (for example, a hard disk, a floppy disk, and a magnetic stripe), an optical storage medium (for example, a digital versatile disc (DVD)), a smartcard, a flash device, a random-access memory (RAM), a read-only memory (ROM), a programmable ROM (PROM), an erasable PROM (EPROM), a register, and any combination thereof. The memory 1503 may be coupled to the processor 1501, so that the processor 1501 can read information and write information to the memory 1503. Specifically, the memory 1503 may be integrated into the processor 1501, or the memory 1503 and the processor 1501 may be separated.

The communication interface 1502 may include a circuit and/or a program, to implement two-way communication between the terminal 1500 and one or more wireless network devices (for example, a router, a switch, and an access point). The communication interface 1502 includes at least one receiving circuit and/or at least one transmitting circuit. In an embodiment, the communication interface 1502 may be implemented partially or completely by a wireless modem.

All related content of the steps in the foregoing method embodiments may be cited in function descriptions of the corresponding functional modules.

An embodiment further provides a computer-readable storage medium. The computer-readable storage medium stores computer instructions. When the computer instructions are run on an electronic device, the electronic device is enabled to perform the foregoing related method steps to implement the encoding method in the foregoing embodiments.

An embodiment further provides a computer program product. When the computer program product is run on a computer, the computer is enabled to perform the foregoing related steps to implement the encoding method in the foregoing embodiments.

In addition, an embodiment of the present disclosure further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, to enable the chip to perform the encoding method in the foregoing method embodiments.

The electronic device, the computer-readable storage medium, the computer program product, or the chip provided in embodiments is configured to perform the corresponding method provided above. Therefore, for beneficial effect that can be achieved, refer to the beneficial effect in the corresponding method provided above.

Based on the descriptions about the foregoing implementations, a person skilled in the art may understand that, for a purpose of convenient and brief description, division into the foregoing functional modules is used as an example for illustration. In actual application, the foregoing functions may be allocated to different functional modules and implemented based on requirements. In other words, an inner structure of an apparatus is divided into different functional modules to implement all or some of the functions described above.

In the several embodiments provided in the present disclosure, it should be understood that the disclosed apparatuses and methods may be implemented in other manners. For example, the described apparatus embodiments are merely examples. For example, division into the modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on an actual requirement to achieve the objectives of the solutions of embodiments.

In addition, functional units in embodiments of the present disclosure may be integrated into one processing unit, or each of the units may exist alone physically, or two or more units may be integrated into one unit. The integrated unit may be implemented in a form of hardware, or may be implemented in a form of a software functional unit.

Any content in embodiments of the present disclosure and any content in a same embodiment can be freely combined. Any combination of the foregoing content falls within the scope of the present disclosure.

When the integrated unit is implemented in the form of a software functional unit and sold or used as an independent product, the integrated unit may be stored in a readable storage medium. Based on such an understanding, the technical solutions of embodiments of the present disclosure essentially, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of the present disclosure. The foregoing storage medium includes any medium, for example, a Universal Serial Bus (USB) flash drive, a removable hard disk, a ROM, a RAM, a magnetic disk, an optical disc, or the like that can store program code.

Methods or algorithm steps described in combination with the content disclosed in embodiments of the present disclosure may be implemented by hardware, or may be implemented by a processor by executing software instructions. The software instructions may include a corresponding software module. The software module may be stored in a RAM, a flash memory, a ROM, an EPROM, an electrically EPROM (EEPROM), a register, a hard disk, a removable hard disk, a compact disc ROM (CD-ROM), or any other form of storage medium that is well known in the art. For example, a storage medium is coupled to the processor, so that the processor can read information from the storage medium or write information into the storage medium. Certainly, the storage medium may be a component of the processor. The processor and the storage medium may be disposed in an ASIC.

A person skilled in the art should be aware that in the foregoing one or more examples, functions described in embodiments of the present disclosure may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer-readable storage medium and a communication medium. The communication medium includes any medium that enables a computer program to be transmitted from one place to another. The storage medium may be any available medium accessible to a general-purpose or special-purpose computer.

The foregoing describes embodiments of the present disclosure with reference to the accompanying drawings. However, the present disclosure is not limited to the foregoing specific implementations. The foregoing specific implementations are merely examples, but are not limitative. Inspired by the present disclosure, a person of ordinary skill in the art may further make modifications without departing from the purposes of the present disclosure and the protection scope of the claims, and all the modifications shall fall within the protection of this application.

What is claimed is:

1. A method, comprising:

obtaining probe data, corresponding to one or more probes in a three-dimensional (3D) scene, wherein the probe data comprises at least one of illumination data or visibility data, and wherein a shading effect of an object in the 3D scene is based on the probe data in a rendering process;

performing data form conversion on the probe data to obtain first intermediate data, wherein the data form conversion comprises domain conversion, wherein the domain conversion comprises at least one of conversion from a non-normalized domain to a normalized domain, conversion from a linear domain to a non-linear domain, conversion from an RGB domain to a YUV domain, conversion from an RGB domain to an XYZ domain, conversion from an RGB domain to a lab domain, or conversion from a picture domain to a transform domain; and encoding the first intermediate data to obtain a bitstream.

2. The method of claim 1, wherein performing the data form conversion on the probe data to obtain the first intermediate data comprises:

performing first processing on the probe data to obtain converted data; and performing second processing on the converted data to obtain the first intermediate data, wherein when the first processing is domain conversion, the second processing comprises at least one of quantization or first manner rearrangement, and wherein when the second processing is the domain conversion, the first processing comprises at least one of the quantization or the first manner rearrangement.

3. The method of claim 2, wherein performing the data form conversion on the probe data to obtain the first intermediate data further comprises performing, prior to performing the first processing on the probe data, third processing on the probe data, wherein the third processing comprises at least one of the domain conversion, the quantization, or the first manner rearrangement.

4. The method of claim 2, wherein performing the second processing on the converted data to obtain the first intermediate data comprises:

performing the second processing on the converted data to obtain first data; and performing second manner rearrangement on the first data to obtain the first intermediate data, wherein the second manner rearrangement pads the first data to a YUV plane.

5. The method of claim 2, wherein when the probe data is the illumination data and when the illumination data comprises a plurality of channels, the first manner rearrangement comprises at least one of discarding data of some channels, converting precision of the illumination data to preset precision, or performing dimension conversion on the illumination data.

6. The method of claim 2, wherein when the probe data is the visibility data and when the visibility data comprises a plurality of channels, the first manner rearrangement comprises at least one of performing channel splitting, converting precision of the visibility data to preset precision, or performing dimension conversion on the visibility data.

7. The method of claim 1, wherein the probe data is represented by a spherical harmonic function basis coefficient.

8. The method of claim 1, wherein the probe data is represented by a two-dimensional (2D) picture or a spherical wavelet basis coefficient.

9. The method of claim 1, further comprising encoding attribute data of the one or more probes to obtain the bitstream, wherein the attribute data comprises at least one of first attribute data for the data form conversion or second attribute data used in the rendering process.

10. The method of claim 1, wherein when the probe data comprises the illumination data and the visibility data, the bitstream comprises bitstream structure information, and wherein the bitstream structure information comprises at least one of a first location of second intermediate data corresponding to the illumination data or a second location of third intermediate data corresponding to the visibility data.

11. The method of claim 1, wherein when the probe data comprises the illumination data and the visibility data, the method further comprises:

determining, based on a first data amount of the illumination data, a second data amount of the visibility data, and a preset bit rate, a first target bit rate and a second target bit rate, wherein the first target bit rate corresponds to the illumination data, wherein the second target bit rate corresponds to the visibility data, and wherein encoding the first intermediate data to obtain the bitstream comprises:

encoding, based on the first target bit rate, second intermediate data corresponding to the illumination data; and encoding, based on the second target bit rate, third intermediate data corresponding to the visibility data to obtain the bitstream.

12. The method of claim 1, wherein when the probe data comprises the illumination data and the visibility data, the method further comprises:

determining, based on a first data amount of the illumination data, a second data amount of the visibility data, and channel feedback information, a first encoding scheme and a second encoding scheme, wherein the first encoding scheme corresponds to the illumination data, wherein the second encoding scheme corresponds to the visibility data, wherein the first encoding scheme and the second encoding scheme comprise intra-frame encoding or inter-frame encoding, and wherein encoding the first intermediate data to obtain the bitstream comprises:

encoding, based on the first encoding scheme, second intermediate data corresponding to the illumination data; and encoding, based on the second encoding scheme, third intermediate data corresponding to the visibility data to obtain the bitstream.

13. A device comprising:

a memory configured to store instructions; and one or more processors coupled to the memory and configured to execute the instructions to cause the device to:

obtain probe data corresponding to one or more probes in a 3D scene, wherein the probe data comprises at least one of illumination data or visibility data, and wherein a shading effect of an object in the 3D scene is based on the probe data in a rendering process;

perform data form conversion on the probe data to obtain first intermediate data, wherein the data form conversion comprises domain conversion, and wherein the domain conversion comprises at least one of conversion from a non-normalized domain to a normalized domain, conversion from a linear domain to a non-linear domain, conversion from an RGB domain to a YUV domain, conversion from an RGB domain to an XYZ domain, conversion from an RGB domain to a lab domain, or conversion from a picture domain to a transform domain; and encode the first intermediate data to obtain a bitstream.

14. The device of claim 13, wherein the one or more processors are further configured to execute the instructions to cause the device to:

perform first processing on the probe data to obtain converted data; and perform second processing on the converted data to obtain the first intermediate data, wherein when the first processing is domain conversion, the second processing comprises at least one of quantization or first manner rearrangement, and wherein when the second processing is the domain conversion, the first processing comprises at least one of the quantization or the first manner rearrangement.

15. The device of claim 14, wherein the one or more processors are further configured to execute the instructions to cause the device to perform, prior to performing first processing, third processing on the probe data, wherein the third processing comprises at least one of the domain conversion, the quantization, or the first manner rearrangement.

16. The device of claim 14, wherein performing the second processing on the converted data to obtain the first intermediate data comprises:

performing the second processing on the converted data to obtain first data; and performing second manner rearrangement on the first data to obtain the intermediate data, wherein the second manner rearrangement pads the first data to a YUV plane.

17. The device of claim 13, wherein the one or more processors are further configured to execute the instructions to cause the device to encode attribute data of the one or more probes to obtain the bitstream, wherein the attribute data comprises at least one of first attribute data for the data form conversion or second attribute data for the rendering process.

18. The device of claim 13, wherein when the probe data comprises the illumination data and the visibility data, the bitstream comprises bitstream structure information, wherein the bitstream structure information comprises at least one of a first location of second intermediate data corresponding to the illumination data or a second location of third intermediate data corresponding to the visibility data.

19. A non-transitory computer-readable storage medium storing a computer program that, when executed by at least one processor of an electronic device, causes the electronic device to:

obtain probe data corresponding to one or more probes in a 3D scene, wherein the probe data comprises at least one of illumination data or visibility data, and wherein a shading effect of an object in the 3D scene is based on the probe data in a rendering process;

perform data form conversion on the probe data to obtain intermediate data, wherein the data form conversion comprises domain conversion, and wherein the domain conversion comprises at least one of conversion from a non-normalized domain to a normalized domain, conversion from a linear domain to a non-linear domain, conversion from an RGB domain to a YUV domain, conversion from an RGB domain to an XYZ domain, conversion from an RGB domain to a lab domain, or conversion from a picture domain to a transform domain; and encode the intermediate data to obtain a bitstream.

20. The non-transitory computer-readable storage medium of claim 19, wherein the computer program, when executed by the at least one processor, further causes the electronic device to:

perform first processing on the probe data to obtain converted data; and perform second processing on the converted data to obtain the intermediate data, wherein when the first processing is domain conversion, the second processing comprises at least one of quantization or first manner rearrangement, and wherein when the second processing is the domain conversion, the first processing comprises at least one of the quantization or the first manner rearrangement.

* * * * *